(12) United States Patent
Kim

(10) Patent No.: US 11,776,300 B2
(45) Date of Patent: Oct. 3, 2023

(54) ELECTRONIC DEVICE AND METHOD FOR OBTAINING BIOMETRIC INFORMATION THEREOF

(71) Applicant: SAMSUNG ELECTRONICS CO., LTD., Suwon-si (KR)

(72) Inventor: Jinho Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/521,097

(22) Filed: Nov. 8, 2021

(65) Prior Publication Data

US 2022/0198176 A1 Jun. 23, 2022

Related U.S. Application Data

(63) Continuation of application No. PCT/KR2021/015148, filed on Oct. 27, 2021.

(30) Foreign Application Priority Data

Dec. 21, 2020 (KR) ........................ 10-2020-0179286

(51) Int. Cl.
  *G06K 9/20* (2006.01)
  *G06V 40/13* (2022.01)
  (Continued)

(52) U.S. Cl.
  CPC ........ *G06V 40/1318* (2022.01); *G06V 10/141* (2022.01); *G06V 10/147* (2022.01);
  (Continued)

(58) Field of Classification Search
  CPC . G06V 40/12–40/1394; G06V 40/13–40/1329
  See application file for complete search history.

(56) References Cited

U.S. PATENT DOCUMENTS

10,437,974 B2 10/2019 He et al.
10,509,944 B2 12/2019 Yoshii et al.
(Continued)

FOREIGN PATENT DOCUMENTS

KR 10-2018-0098443 9/2018
KR 10-2019-0112624 10/2019
(Continued)

OTHER PUBLICATIONS

Search Report dated Feb. 25, 2022 in counterpart International Patent Application No. PCT/KR2021/015148.

*Primary Examiner* — Brian Werner
(74) *Attorney, Agent, or Firm* — Nixon & Vanderhye P.C.

(57) ABSTRACT

According to an embodiment, an electronic device may include: a display including a polarization layer, a biometric sensor positioned to at least partially overlap the display, and an optical member including a light condenser positioned between the display and the biometric sensor. The biometric sensor may include a light receiving unit comprising light receiving circuitry configured to receive light emitted from the display and reflected by an external object. A length of the light receiving unit in a first direction, which is a polarization axis direction of the polarization layer, is greater than a length of the light receiving unit in a second direction crossing the first direction.

11 Claims, 19 Drawing Sheets

(51) Int. Cl.
  *G06V 10/32* (2022.01)
  *G06V 10/141* (2022.01)
  *G06V 10/147* (2022.01)
  *G06V 40/12* (2022.01)
  *G02B 5/30* (2006.01)
  *G06V 10/24* (2022.01)
(52) U.S. Cl.
  CPC .......... *G06V 10/32* (2022.01); *G06V 40/1365* (2022.01); *G02B 5/30* (2013.01); *G06V 10/247* (2022.01)

(56) References Cited

U.S. PATENT DOCUMENTS

| | | |
|---|---|---|
| 11,017,068 B2 | 5/2021 | He et al. |
| 11,037,012 B2 | 6/2021 | Schwartz et al. |
| 2005/0207624 A1* | 9/2005 | Ehlers ................ G06K 19/0723 340/5.6 |
| 2018/0247098 A1 | 8/2018 | Yoshii et al. |
| 2019/0294851 A1 | 9/2019 | Chung et al. |
| 2020/0117875 A1* | 4/2020 | Cai ........................ H10K 59/00 |
| 2020/0364436 A1 | 11/2020 | Beon et al. |
| 2020/0380282 A1 | 12/2020 | Schwartz et al. |

FOREIGN PATENT DOCUMENTS

| | | |
|---|---|---|
| KR | 10-2019-0140439 | 12/2019 |
| KR | 10-2020-0058850 | 5/2020 |
| KR | 10-2020-0131932 | 11/2020 |

\* cited by examiner ated in FIG. 1 according to various embodiments;
ELECTRONIC DEVICE AND METHOD FOR OBTAINING BIOMETRIC INFORMATION THEREOF

CROSS-REFERENCE TO RELATED APPLICATIONS

This application is a continuation of International Application No. PCT/KR2021/015148 designating the United States, filed on Oct. 27, 2021, in the Korean Intellectual Property Receiving Office and claiming priority to Korean Patent Application No. 10-2020-0179286, filed on Dec. 21, 2020 in the Korean Intellectual Property Office, the disclosures of which are incorporated by reference herein in their entireties.

BACKGROUND

Field

The disclosure relates to an electronic device and a method for obtaining biometric information of the electronic device.

Description of Related Art

Various types of electronic devices are being developed and supplied. For example, as well as a conventional desktop PC, mobile devices having various functions, such as smartphones, tablet PCs, or wearable devices are increasingly distributed. Besides, electronic devices have recently included various types of sensors to perform various functions. For example, in association with the locking, unlocking, security, and/or user authentication of an electronic device, many electronic devices have recently used a user's biometric information (e.g., fingerprint information) obtained through a biometric sensor.

SUMMARY

Embodiments of the disclosure provide an electronic device capable of reducing the size of a biometric sensor and increasing the yield of the biometric sensor.

According to an example embodiment, an electronic device may include: a display including a polarization layer, a biometric sensor positioned to at least partially overlap the display, and an optical member comprising a light condenser positioned between the display and the biometric sensor. The biometric sensor may include a light receiving unit including light receiving circuitry configured to receive light that is emitted from the display and is reflected by an external object. A length of the light receiving unit in a first direction, which is a polarization axis direction of the polarization layer, is greater than a length of the light receiving unit in a second direction crossing the first direction.

According to an example embodiment, a method for obtaining biometric information of an electronic device may include: detecting a touch of an object, emitting light through one region of a display including a polarization layer based on the touch of the object, obtaining a raw image having an image magnification that is different depending on a direction, based on light that is emitted from the display, reflected on the object, and received by a light receiving unit of a biometric sensor, and obtaining biometric information by correcting the raw image such that all regions of the raw image have an same image magnification.

According to an example embodiment, an electronic device may include: a display including a polarization layer, a biometric sensor positioned to at least partially overlap the display, and an optical member including a light condenser positioned between the display and the biometric sensor. The optical member may include an asymmetric lens having a curvature in a first direction different from a curvature in a second direction. The biometric sensor may include a light receiving unit including light receiving circuitry configured to receive light emitted from the display and reflected by an external object.

According to various example embodiments, an electronic device may reduce the size of a biometric sensor without degrading the performance of the biometric sensor, and increase the yield efficiency of the biometric sensor.

Besides, a variety of effects directly or indirectly understood through the specification may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

With regard to description of drawings, the same or similar components will be marked by the same or similar reference signs.

DETAILED DESCRIPTION

Hereinafter, various example embodiments of the disclosure may be described with reference to accompanying drawings. However, those of ordinary skill in the art will recognize that various modifications, equivalents, and/or alternatives on various embodiments described herein may be variously made without departing from the scope and spirit of the disclosure.

Figure 1:
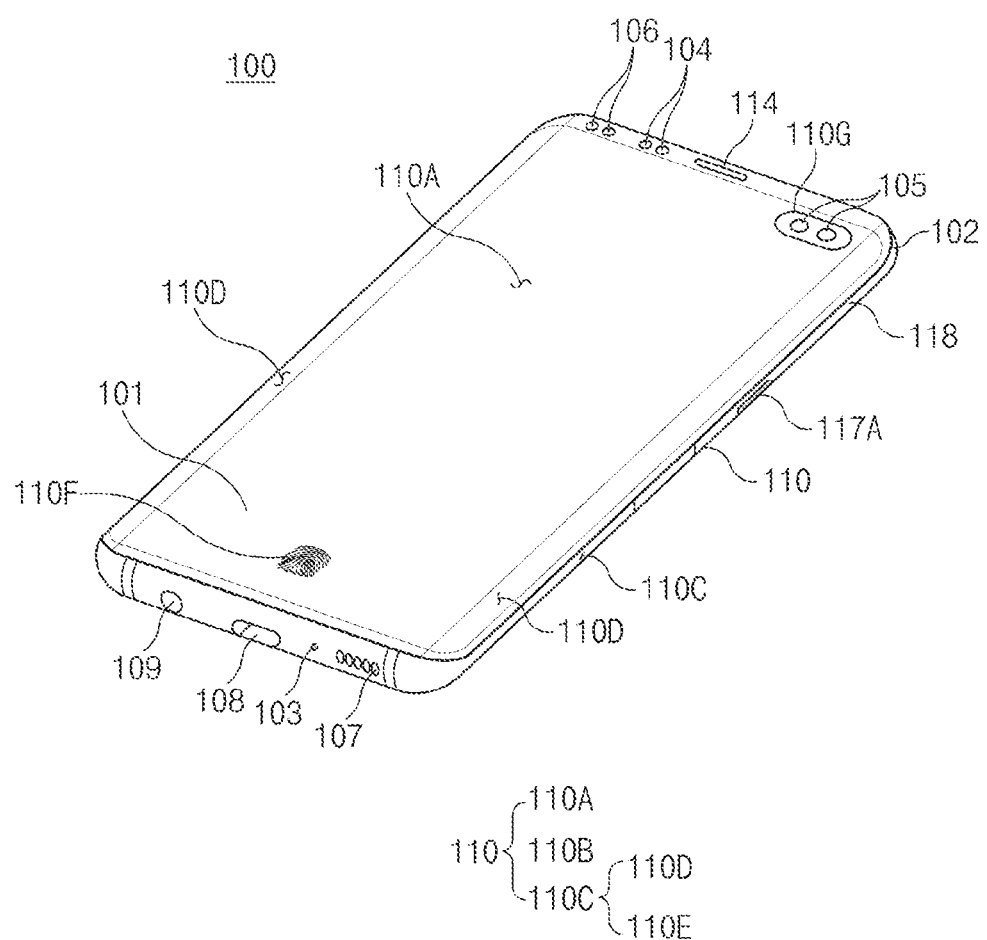
FIG. 1 is a front perspective view of an electronic device according to various embodiments.
Figure 2:
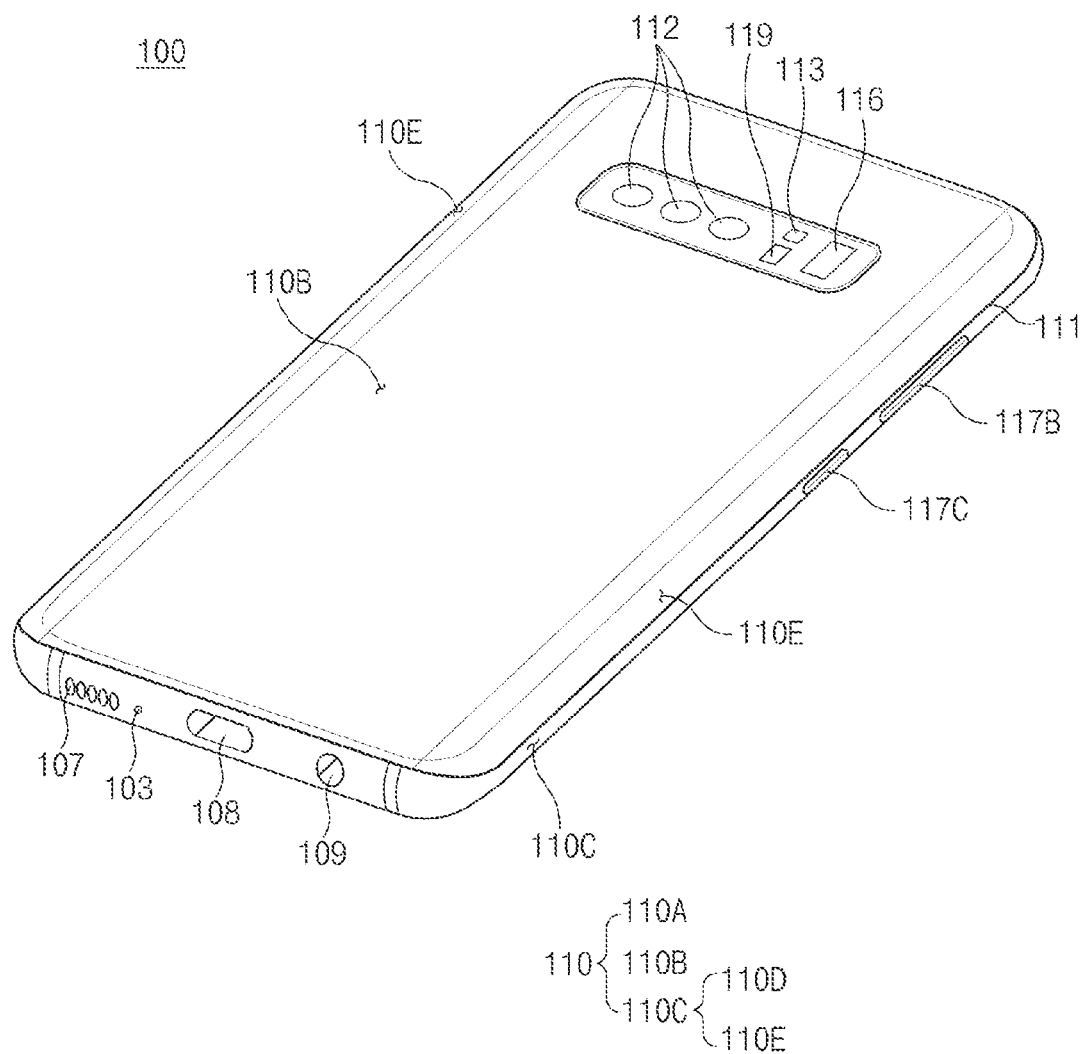
FIG. 2 is a back perspective view of an electronic device illustrated in FIG. 1 according to various embodiments.

FIG. 1 is a front perspective view of an electronic device, according to various embodiments. FIG. 2 is a back perspective view of an electronic device illustrated in FIG. 1 according to various embodiments.

Referring to FIGS. 1 and 2, an electronic device 100 according to an embodiment may include a housing 110 including a first surface (or a front surface) 110A, a second surface (or a back surface) 110B, and a side surface 110C surrounding a space between the first surface 110A and the second surface 110B. In an embodiment (not illustrated), the housing 110 may be referred to as a "structure" that forms a portion of the first surface 110A, the second surface 110B, and the side surface 110C of FIG. 1.

According to an embodiment, the first surface 110A may be implemented with a front plate 102 (e.g., a glass plate including various coating layers, or a polymer plate), at least a portion of which is substantially transparent. The second surface 110B may be formed by a rear plate 111 that is substantially opaque. For example, the rear plate 111 may be formed of a coated or colored glass, a ceramic, a polymer, a metal (e.g., aluminum, stainless steel (STS), or magnesium), or the combination of at least two of the materials. The side surface 110C may be coupled to the front plate 102 and the rear plate 111, and may be formed by a side bezel structure (or a "side member") 118 including a metal and/or a polymer. In an embodiment, the rear plate 111 and the side bezel structure 118 may be integrally formed and may include the same material (e.g., a metal material such as aluminum).

In the embodiment that is illustrated, the front plate 102 may include two first regions 110D, which are curved toward the rear plate 111 from the first surface 110A so as to be seamlessly extended, at opposite long edges of the front plate 102.

In the embodiment (refer to FIG. 2) that is illustrated, the rear plate 111 may include two second regions 110E, which are bent toward the front plate 102 from the second surface 110B so as to be seamlessly extended, at opposite long edges thereof.

In an embodiment, the front plate 102 (or the rear plate 111) may include only one of the first regions 110D (or the second regions 110E). In an embodiment, the front plate 102 (or the rear plate 111) may not include only a part of the first regions 110D (or the second regions 110E).

In the embodiments, when viewed from one side of the electronic device 100, the side bezel structure 118 may have a first thickness (or width) on one side (e.g., a short side) where the first regions 110D or the second regions 110E are not included, and may have a second thickness smaller than the first thickness on one side (e.g., a long side) where the first regions 110D or the second regions 110E are included.

According to an embodiment, the electronic device 100 may include at least one or more of a display 101, an audio module (103, 107, 114), a sensor module (104, 116, 119), a camera module (105, 112, 113), a key input device (117A, 117B, 117C), a light emitting device 106, and a connector hole (108, 109). In an embodiment, the electronic device 100 may not include at least one (e.g., the key input device (117A, 117B, 117C) or the light emitting device 106) of the components or may further include any other component.

For example, the display 101 may be exposed through a substantial portion of the front plate 102. In any embodiment, at least part of the display 101 may be exposed through the first surface 110A and the front plate 102 including the first regions 111D of the side surface 110C.

In any embodiment, the corners of the display 101 may be formed to be mostly identical to a shape of an outer portion of the front plate 102 adjacent thereto. In an embodiment (not illustrated), to expand an area where the display 101 is exposed, a difference between an outer portion of the display 101 and an outer portion of the front plate 102 may be formed substantially identically.

In an embodiment, a surface of the housing 110 (or the front plate 102) may include a screen display region that is formed as the display 101 is visually exposed. For example, the screen display region may include the first plane 110A and the first regions 110D of the side surface.

In the embodiment that is illustrated, the screen display region (110A, 110D) may include a sensing region 110F configured to obtain biometric information of a user. Here, the expression "the screen display region (110A, 110D) includes the sensing region 110F" may be understood as at least a portion of the sensing region 110F overlaps the screen display region (110A, 110D). In other words, like the remaining portion of the screen display region (110A, 110D), the sensing region 110F may display visual information by the display 101, and in addition, may mean a region capable of obtaining biometric information (e.g., a fingerprint information) of the user.

In the embodiment that is illustrated, the screen display region (110A, 110D) of the display 101 may include a region 110G where the first camera device 105 (e.g., a punch through camera) is capable of being visually exposed. At least a portion of a periphery of the region 110G where the first camera device 105 is visually exposed may be surrounded by the screen display region (110A, 110D). In various embodiments, the first camera device 105 may include a plurality of camera devices.

In an embodiment (not illustrated), a recess or an opening may be formed at a portion of the screen display region (110A, 110D) of the display 101, and at least one or more of the audio module 114, the first sensor module 104, and the light emitting device 106 may be provided to be aligned with the recess or the opening.

In an embodiment (not illustrated), the display 101 may include at least one or more of the audio module 114, the sensor module (104, 116, 119), and the light emitting device 106 below the screen display region (110A, 110D).

In an embodiment (not illustrated), the display 101 may be combined with a touch sensing circuit, a pressure sensor capable of measuring the intensity (or pressure) of a touch, and/or a digitizer capable of detecting a magnetic stylus pen or may be disposed adjacent thereto.

In any embodiment, at least part of the sensor module (104, 116, 119) and/or at least part of the key input device (117A, 117B, 117C) may be disposed in the side surface 110C (e.g., the first regions 110D and/or the second region 110E).

The audio module (103, 107, 114) may include the microphone hole 103 and the speaker hole (107, 114). A microphone for obtaining external sound may be positioned within the microphone hole 103; in an embodiment, a plurality of microphones may be positioned to detect a direction of sound. The speaker hole (107, 114) may include the external speaker hole 107 and the receiver hole 114 for making a call. In an embodiment, the speaker hole (107, 114) and the microphone hole 103 may be implemented with one hole, or a speaker (e.g., a piezoelectric speaker) may be included without the speaker hole (107, 114).

The sensor module (104, 116, 119) may generate an electrical signal or a data value corresponding to an internal operation state of the electronic device 100 or corresponding to an external environment state. For example, the sensor module (104, 116, 119) may include, for example, the first sensor module 104 (e.g., a proximity sensor) disposed on the first surface 110A of the housing 110, the second sensor module 116 (e.g., a time-of-flight (ToF) camera device) disposed on the second surface 110B of the housing 110, the third sensor module 119 (e.g., a hear rate monitor (HRM) sensor) disposed on the second surface 110B of the housing 110, and/or a fourth sensor module (e.g., a sensor module 190 of FIG. 3) (e.g., a fingerprint sensor) coupled to the display 101.

In various embodiments, the second sensor module 116 may include a TOF camera device for distance measurement.

In various embodiments, at least a portion of the fourth sensor module (e.g., the sensor module 190 of FIG. 3) may be disposed in the screen display region (110A, 110D). For example, the fourth sensor module may be disposed on a rear surface of the display 101. That is, the fourth sensor module (e.g., the sensor module 190 of FIG. 3) may not be exposed through the screen display region (110A, 110D) and may form the sensing region 110F in at least a portion of the screen display region (110A, 110D).

In an embodiment (not illustrated), the sensing region 110F may be disposed on the second surface 110B as well as the first surface 110A (e.g., the screen display region (110A, 110D)) of the housing 110.

In various embodiments, the electronic device 100 may further include a sensor module not illustrated, for example, at least one of a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, or a illuminance sensor.

The camera module (105, 112, 113) may include a first camera device 105 (e.g., a punch hole camera device) exposed to the first surface 110A of the electronic device 100, a second camera module 112 exposed to the second surface 110B of the electronic device 100, and/or a flash 113.

In the illustrated embodiment, the first camera device 105 may be exposed through a part of the screen display region 110D of the first surface 110A. For example, the first camera device 105 may be exposed to a part of the screen display region 110D through an opening (not illustrated) formed in a part of the display 101.

In the illustrated embodiment, the second camera device 112 may include a plurality of camera devices (e.g., a dual camera or a triple camera). However, the second camera device 112 may not be necessarily limited to including a plurality of camera devices, and may include a single camera device.

The camera devices 105 and 112 may include one or more lenses, an image sensor, and/or an image signal processor. The flash 113 may include, for example, a light emitting diode or a xenon lamp. In an embodiment, two or more lenses (e.g., infrared camera, wide-angle, and telephoto lenses) and image sensors may be disposed on one surface of the electronic device 100.

The key input device (117A, 117B, 117C) may be disposed on the side surface 110C of the housing 110. In an embodiment, the electronic device 100 may not include all or a part of the key input device (117A, 117B, 117C) mentioned above, and the key input device(s) (117A, 117B, 117C) not included therein may be implemented on the display 101 in the form of a soft key. In any embodiment, the key input device may include a sensor module (e.g., the sensor module 190 of FIG. 3) formed in the sensing region 110F included in the screen display region (110A, 110D).

The light emitting device 106 may be disposed, for example, on the first surface 110A of the housing 110. The light emitting device 106 may provide status information of the electronic device 100, for example, in the form of light. In an embodiment, the light emitting device 106 may provide, for example, a light source operating in conjunction with an operation of the first camera module 105. The light emitting device 106 may include, for example, a light emitting diode (LED), an IR LED, and a xenon lamp.

The connector hole (108, 109) may include the first connector hole 108 capable of receiving a connector (e.g., a USB connector) for exchanging a power and/or data with an external electronic device, and/or the second connector hole 109 (e.g., an earphone jack) capable of receiving a connector for exchanging an audio signal with the external electronic device.

Figure 3:
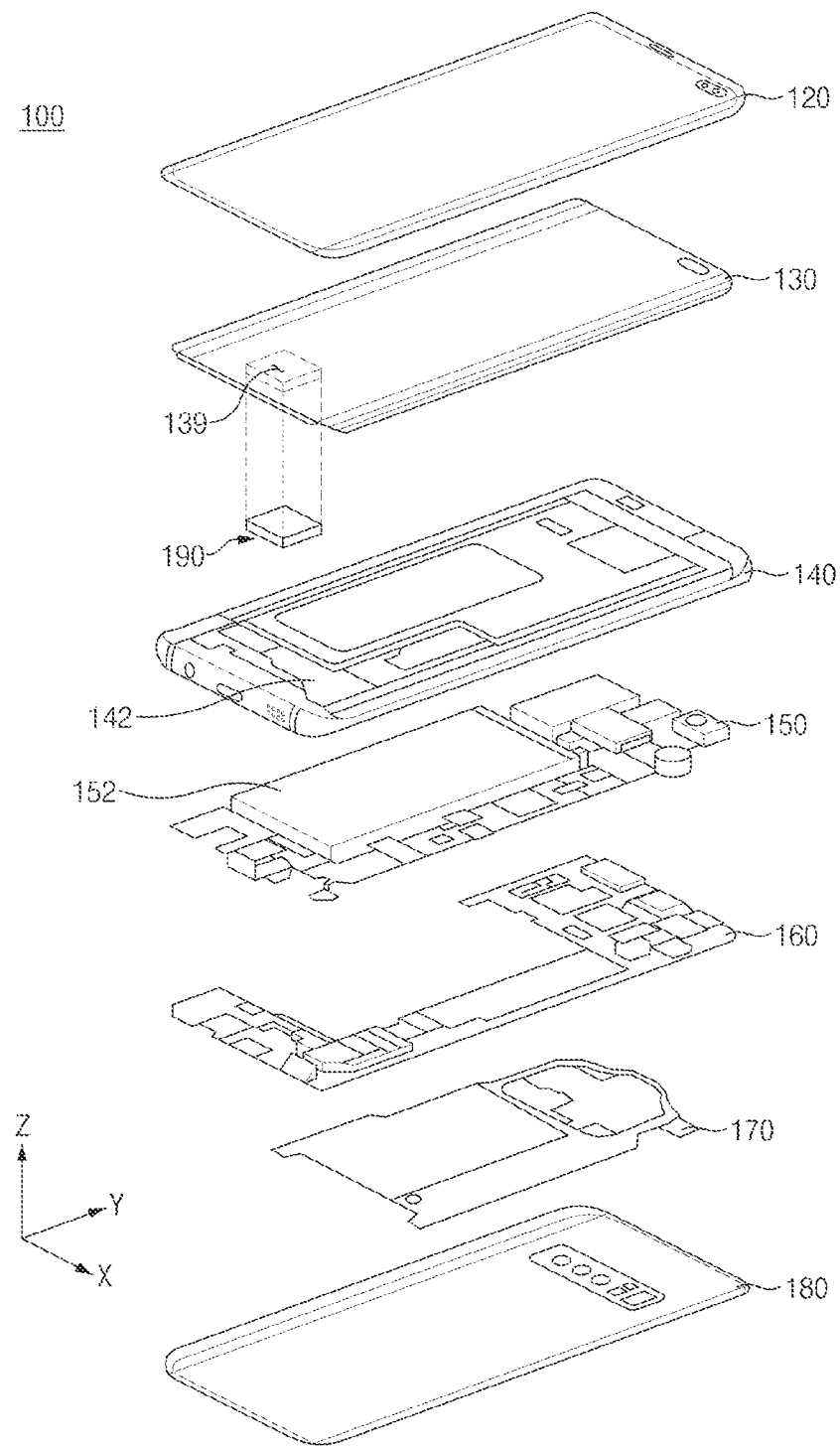
FIG. 3 is an exploded perspective view of an electronic device illustrated in FIG. 1 according to various embodiments.

FIG. 3 is an exploded perspective view of an electronic device illustrated in FIG. 1 according to various embodiments. Referring to FIG. 3, the electronic device 100 may include a side member 140, a first support member 142 (e.g., a bracket), a front plate 120, a display 130 (e.g., the display 101 in FIG. 1), a printed circuit board 150, a battery 152, a second support member 160 (e.g., a rear case), an antenna 170, a rear plate 180, and the sensor module 190. In an embodiment, the electronic device 100 may not include at least one (e.g., the first support member 142 or the second support member 160) of the components or may further include any other component. At least one of the components of the electronic device 100 may be identical or similar to at least one of the components of the electronic device 100 of FIG. 1 or 2, and thus, additional description will be omitted to avoid redundancy.

The display 130 may be located under the front plate 120 and may include a sensing region 139 (e.g., the sensing region 110F of FIG. 1). At least some components (e.g., an embossing layer) of the display 130 in the sensing region 139 may include an opening.

The first support member 142 may be disposed within the electronic device 100 so as to be connected with the side member 140, or may be integrally formed with the side member 140. For example, the first support member 142 may be formed of a metal material and/or a nonmetal material (e.g., polymer). The display 130 may be coupled to one surface of the first support member 142, and the printed circuit board 150 may be coupled to an opposite surface of the substrate 130. A processor, a memory, and/or an interface may be mounted on the printed circuit board 150. For example, the processor may include one or more of a central processing unit, an application processor, a graphic processing device, an image signal processor, a sensor hub processor, or a communication processor.

The memory may include, for example, a volatile memory or a nonvolatile memory.

The interface may include, for example, a high definition multimedia interface (HDMI), a universal serial bus (USB) interface, a secure digital (SD) card interface, and/or an audio interface. The interface may electrically or physically connect, for example, the electronic device 100 with an external electronic device and may include a USB connector, an SD card/MMC connector, or an audio connector.

The battery 152 that is a device for supplying a power to at least one component of the electronic device 100 may include, for example, a primary cell incapable of being recharged, a secondary cell rechargeable, or a fuel cell. For example, at least part of the battery 152 may be disposed on substantially the same plane as the printed circuit board 150. The battery 152 may be integrally disposed within the electronic device 100 or may be disposed to be removable from the electronic device 100.

The antenna 170 may be interposed between the rear plate 180 and the battery 152. The antenna 170 may include, for example, a near field communication (NFC) antenna, an antenna for wireless charging, and/or a magnetic secure transmission (MST) antenna. For example, the antenna 170 may perform short range communication with an external device or may wirelessly transmit/receive a power necessary to charge. In an embodiment, an antenna structure may be implemented with a portion of the side member 140 and/or the first support member 142, or with a combination thereof.

The sensor module 190 may be positioned below the display 130. The sensor module 190 may overlap at least a portion of the sensing region 139 of the display 130. The sensor module 190 may include an optical member for condensing light and a biometric sensor (e.g., an image sensor) to which the light condensed by the optical member is incident.

Figure 4:
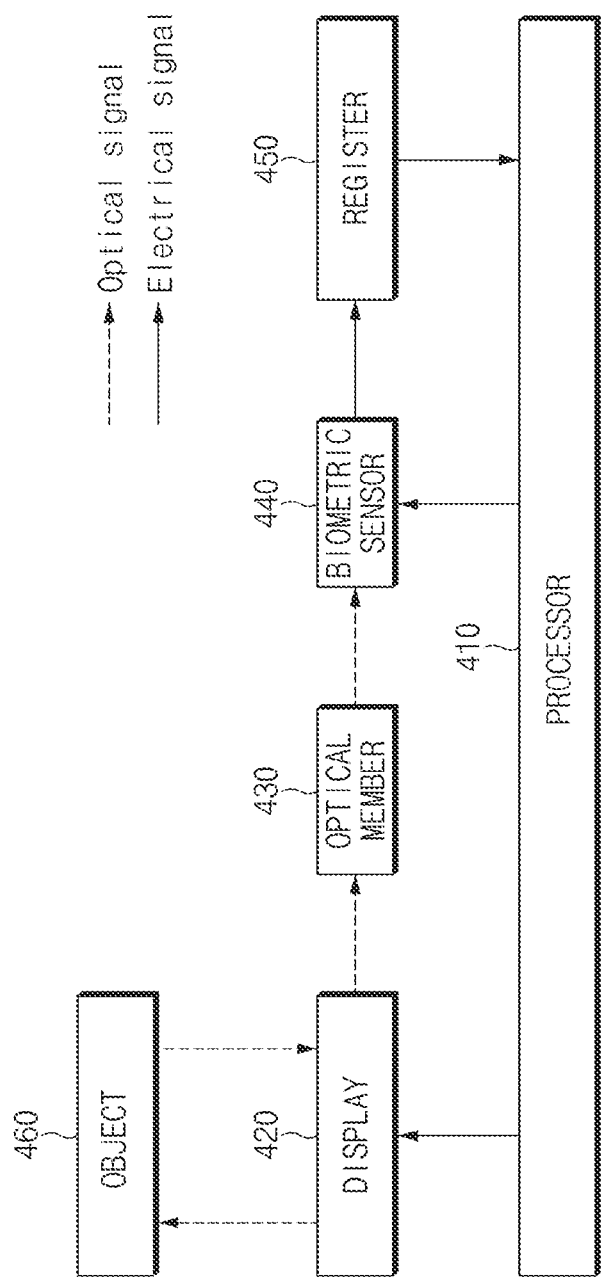
FIG. 4 is a block diagram illustrating an example configuration of an electronic device for obtaining biometric information, according to various embodiments.

FIG. 4 is a block diagram illustrating an example configuration of an electronic device (e.g., the electronic device 100 of FIG. 1) for obtaining biometric information, according to various embodiments. The electronic device 100 according to an embodiment includes a display 420, a sensor module (e.g., including at least one sensor) (430, 440) (e.g., the sensor module 190 of FIG. 3), a register 450 (e.g., a memory 1930 of FIG. 19), and a processor (e.g., including processing circuitry) 410 (e.g., the processor 1920 of FIG. 19). The sensor module (430, 440) may include the optical member 430 and the biometric sensor 440.

In an embodiment, the display 420 may include at least one light source (e.g., a pixel) for emitting light. At least one light source may be disposed on the display 420 in an array structure. For example, the at least one light source may include a light emitting device such as an organic light emitting diode (OLED), a micro light emitting diode (LED), etc.

In an embodiment, at least one light source may provide specified light under the control of the processor 410 or a display driver IC (DDI).

The display 420 may display an image by emitting light through a light source. The display 420 may emit light from at least some regions of the display 420 to detect biometric information. For example, a light source provided to detect the biometric information may consume a current (or voltage) higher than a light source provided to display an image. The light source provided to detect the biometric information may have a set color (e.g., bright color (e.g., white or green)) or set brightness.

The display 420 may include a polarization layer (e.g., the polarization layer 521 of FIG. 5) to prevent and/or reduce external light from being reflected and then being visually perceived by a user.

The display 420 may be planar or curved, or may be implemented with a combination of a flat surface and a curved surface. The display 420 may be formed of a rigid material or a flexible material.

In an embodiment, when viewed from one surface of the display 420 or one surface (e.g., one surface (z-axis direction) on which a display of the electronic device 100 of FIG. 3 is exposed to the outside) where the display 420 is exposed to the outside, the optical member 430 and the biometric sensor 440 may be arranged such that at least some regions disposed under the display 420 overlap the display 420. The optical member 430 may include a condensing element so as to condense light that is reflected from an external object 460 (e.g., a finger) and then passes through the display 420. For example, the optical member 430 may include, for example, and without limitation, a lens, a micro lens, an optical fiber, a pinhole array, a collimator, or the like.

The biometric sensor 440 may detect light condensed by the optical member 430. For example, the biometric sensor 440 may include an image sensor that generates a fingerprint image. The biometric sensor 440 may include a light receiving unit (e.g., a photo diode) to which the reflected light reflected from the object 460 is incident. The biometric sensor 440 may generate an electrical signal (e.g., a current signal) based on the amount of reflected light incident through the light receiving unit.

In an embodiment, the register 450 may record the amount (or a current signal generated based on the amount of reflected light) of reflected light detected when the specified light source of the display 420 is turned on. The register 450 may transmit a value associated with the recorded amount of reflected light to the processor 410.

In an embodiment, the processor 410 may be operatively, electrically, and/or functionally connected to the display 420, the biometric sensor 440, and the register 450.

In an embodiment, the processor 410 may include various processing circuitry and set the emission light of the display 420 by delivering a first control signal to the display 420 in response to the object 460 contacting the display 420. The processor 410 may set a location, intensity, pattern, and/or timing at which the display 420 emits light. For example, when the electronic device starts to measure a fingerprint in the case where the object 460 is the user's finger, the processor 410 may set a measurement range of a fingerprint based on fingerprint information or contact information (e.g., a contact location, a contact area, or contact strength) from a touch sensor. For example, a touch sensor may be included in the display 420. The processor 410 may deliver, to the display 420, the first control signal for operating at least one light source corresponding to a measurement range. For example, the processor 410 may be configured to emit light from the display 420 until all regions corresponding to a biometric information measurement range are scanned.

In an embodiment, the processor 410 may set timing, at which the biometric sensor 440 is activated, by delivering a second control signal to the biometric sensor 440 in response to the contact of the object 460. For example, when the biometric sensor 440 is implemented in a form of at least one or more arrays, the processor 410 may activate the biometric sensor 440 by transmitting the second control signal to the biometric sensor 440 disposed on a region on the display 420 contacted by the object 460, on one surface of the display 420, or under the display 420.

In an embodiment, the processor 410 may be configured to synchronize the operation timing of a light source of the display 420 and the operation timing of the biometric sensor 440. The processor 410 may operate the biometric sensor 440 disposed in a region corresponding to a region, in which the display 420 emits light, on one surface of the display 420, or under the display 420. While the display 420 emits light, the processor 410 may activate the biometric sensor 440 so as to detect light reflected from the object 460. For example, the processor 410 may activate the at least one biometric sensor 440 disposed at a location overlapping a region, in which the display 420 emits light, in a thickness direction (e.g., z axis direction of FIG. 3) of the display 420. As another example, the processor 410 may activate the biometric sensor 440 disposed at a location overlapping a region, in which the display 420 emits light, in a thickness direction of the display 420 and a region surrounding the location.

In an embodiment, the biometric sensor 440 may generate sensing data based on the detected reflected light. For example, the biometric sensor 440 may generate the sensing data based on the amount of light, which is reflected from the object 460, from among light emitted from the display 420. The sensing data may be stored in the register 450.

In an embodiment, the processor 410 may obtain the sensing data including a value, which is stored in the register 450 and which is associated with the amount of reflected light. The processor 410 may reconstruct biometric information associated with the object 460 using the obtained sensing data. For example, when a region corresponding to a biometric information measurement range is completely measured, the processor 410 may form an image associated with biometric information in the biometric information measurement range based on the stored sensing data. For example, when the object 460 is the user's finger, the processor 410 may generate a fingerprint image based on the amount of reflected light obtained from the register 450. As another example, the processor 410 may generate a raw image based on the sensing data and then may generate the fingerprint image by correcting the raw image.

Figure 5:
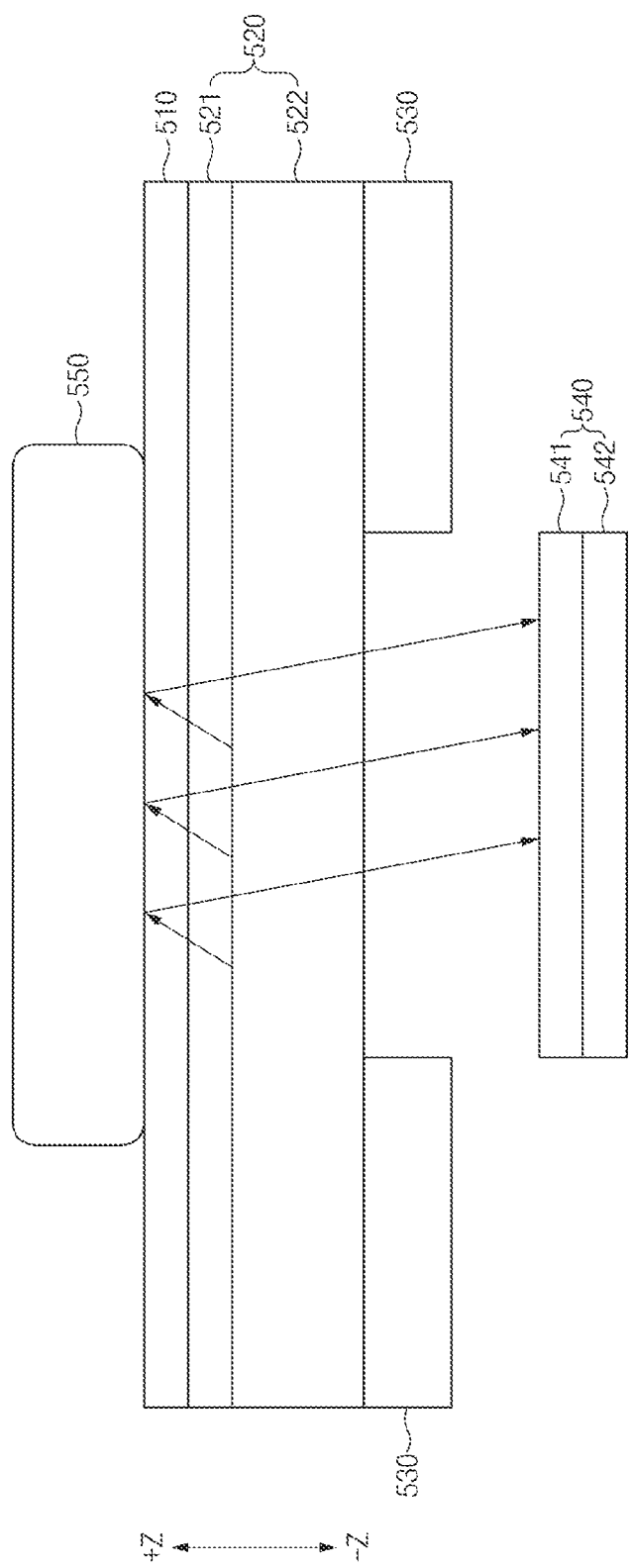
FIG. 5 is a cross-sectional view of an electronic device, according to various embodiments.

FIG. 5 is a cross-sectional view of an electronic device according to various embodiments. Referring to FIG. 5, an electronic device (e.g., the electronic device 100 of FIG. 1) according to an embodiment may include a front plate 510 (e.g., the front plate 120 of FIG. 3), a display 520 (e.g., the display 130 of FIG. 3), an embossing layer 530, and a sensor module (e.g., including at least one sensor) 540 (e.g., the sensor module 190 of FIG. 3).

The display 520 may be located under the front plate (e.g., cover glass or cover film) 510 (e.g., −Z axis direction). The display 520 may include a polarization layer 521 and a pixel circuit layer 522. The polarization layer 521 may transmit light polarized in a polarization axis direction and may absorb or reflect the remaining light. The polarization layer 521 may be located between the pixel circuit layer 522 and the front plate 510, and may prevent and/or reduce external light from being reflected and then being visually perceived by a user. The pixel circuit layer 522 may include electrical elements included in the plurality of pixels. For example, the pixel circuit layer 522 may include a plurality of thin film transistors and a plurality of signal lines. The plurality of pixels of the pixel circuit layer 522 may emit light. For example, the pixel circuit layer 522 may include at least one thin film transistor and an organic light emitting diode (OLED) electrically connected to at least one signal line. The arrangement of the polarization layer 521 and the pixel circuit layer 522 is not limited to that illustrated in FIG. 5. For example, at least one layer may be further located between the polarization layer 521 and the pixel circuit layer 522 or on the polarization layer 521 (e.g., +Z axis direction).

The embossing layer 530 may be located under the display 520 (e.g., −Z axis direction). The embossing layer 530 may include a material for buffering an impact applied to the front plate 510 or the display 520. The embossing layer 530 may include an opening in a region corresponding to the sensor module 540. For example, the opening of the embossing layer 530 may at least partially overlap the sensor module 540. For example, the opening of the embossing layer 530 may at least partially overlap the sensor module 540 with respect to a Z axis.

The sensor module 540 may include an optical member 541 and a biometric sensor 542. Light emitted from the pixel circuit layer 522 of the display 520 may be reflected by an object 550 (e.g., a finger) located on one surface (e.g., a surface located in the +Z axis direction) of the front plate 510. The reflected light may sequentially pass through the polarization layer 521 and the pixel circuit layer 522 of the display 520 and then may be incident to the sensor module 540. The optical member 541 may include a condensing element for condensing light. For example, the optical member 541 may include a lens, a micro lens, an optical fiber, a pinhole array, or a collimator. As another example, the optical member 541 may include a plurality of lenses arranged in the +Z axis direction. The biometric sensor 542 may be disposed under the optical member 541 (e.g., −Z axis direction) so as to generate sensing data using light that is reflected by the object 550 and is condensed by the optical member 541. For example, the biometric sensor 542 may be an image sensor, and may include a light receiving unit (or a light receiving element) to which light is incident.

Hereinafter, an effective area of an image obtained based on light that is reflected from an object (e.g., a finger) and passes through a polarization layer and an optical member will be described in greater detail below with reference to FIGS. 6, 7 and 8.

Figure 6:
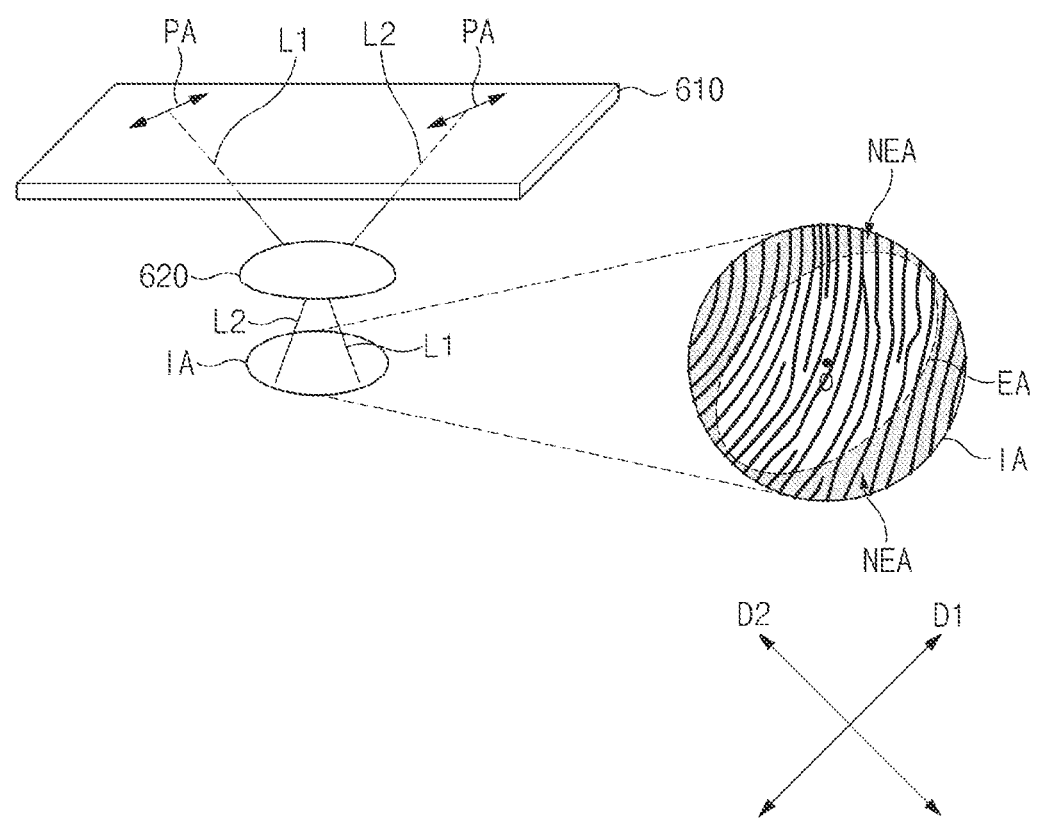
FIG. 6 is a diagram illustrating an effective area of an image according to a polarization axis direction of a polarization layer according to various embodiments.

FIG. 6 is a diagram illustrating an effective area of an image according to a polarization axis direction of a polarization layer according to various embodiments. FIG. 7 is a diagram illustrating an enlarged view of the image region of FIG. 6 according to various embodiments. FIG. 8 is a graph illustrating reflectivity according to an angle of incidence of each of S-polarized light and P-polarized light, which are incident from a first medium (e.g., air) to a second medium (e.g., glass) according to various embodiments. In FIG. 8, a first curve 810 indicates reflectivity Rs of S-polarized light, and a second curve 820 indicates reflectivity Rp of P-polarized light.

Referring to FIG. 6, an electronic device (e.g., the electronic device 100 of FIG. 1) according to an embodiment may include a polarization layer 610 (e.g., the polarization layer 521 of FIG. 5) and an optical member 620 (e.g., the optical member 541 of FIG. 5). The polarization layer 610 may transmit light having an oscillation direction of an electric field, which is a direction of a polarization axis PA (or a first direction D1), and may absorb or reflect the remaining light. The polarization layer 610 may transmit only light (L1, L2) polarized in the direction of the polarization axis PA among the light reflected by an object (e.g., a finger). The light (L1, L2) passing through the polarization layer 610 may be incident on the optical member 620. A portion of light reaching the optical member 620 may be reflected from a surface of the optical member 620. The remaining portions of the light reaching the optical member 620 may pass through the optical member 620. The transmittance of light with respect to the optical member 620 may be determined by at least one of a polarization axis direction of the light, an incident direction of the light, or an incident surface of the light. Hereinafter, the polarization of light passing through the optical member 620 will be described using the first light L1 and the second light L2 by way of example.

The light passing through the optical member 620 may form an image area IA. The image area IA may be an area in which light passing through the optical member 620 arrives and thus an image is formed. According to an embodiment, a ratio of P-polarized light may increase as a distance from a midpoint O of the image area IA in the first direction D1 increases. A ratio of S-polarized light may increase as a distance from the midpoint O of the image area IA in the second direction D2 increases. The first direction D1 may be the same as the direction of the polarization axis PA of the polarization layer 610. The second direction D2 may be a direction substantially perpendicular to the first direction D1. The first light L1 may be light that reaches a region in the second direction D2 from the midpoint O of the image area IA. The second light L2 may be light that reaches a region in the first direction D1 from the midpoint O. The first light L1 polarized in a direction (the direction of the polarization axis PA) may be S-polarized light having a feature indicating that a surface of the optical member 620 to which the first light L1 is incident is parallel to the polarization axis direction (the direction of the polarization axis PA) of the first light L1. In other words, the oscillation direction of the electric field vector of the first light L1 may be perpendicular to an incident surface. The incident surface may mean a plane determined by the incident light and the incident normal. Incident light, reflected light, and transmitted light may be located on the incident surface. The second light L2 polarized in a direction (the direction of the polarization axis PA) may be P-polarized light having a feature indicating that the surface of the optical member 620 to which the second light L2 is incident is perpendicular to the polarization axis direction (the direction of the polarization axis PA) of the second light L2. In other words, the oscillation direction of the electric field vector of the second light L2 may be included in the incident surface.

Figure 8:
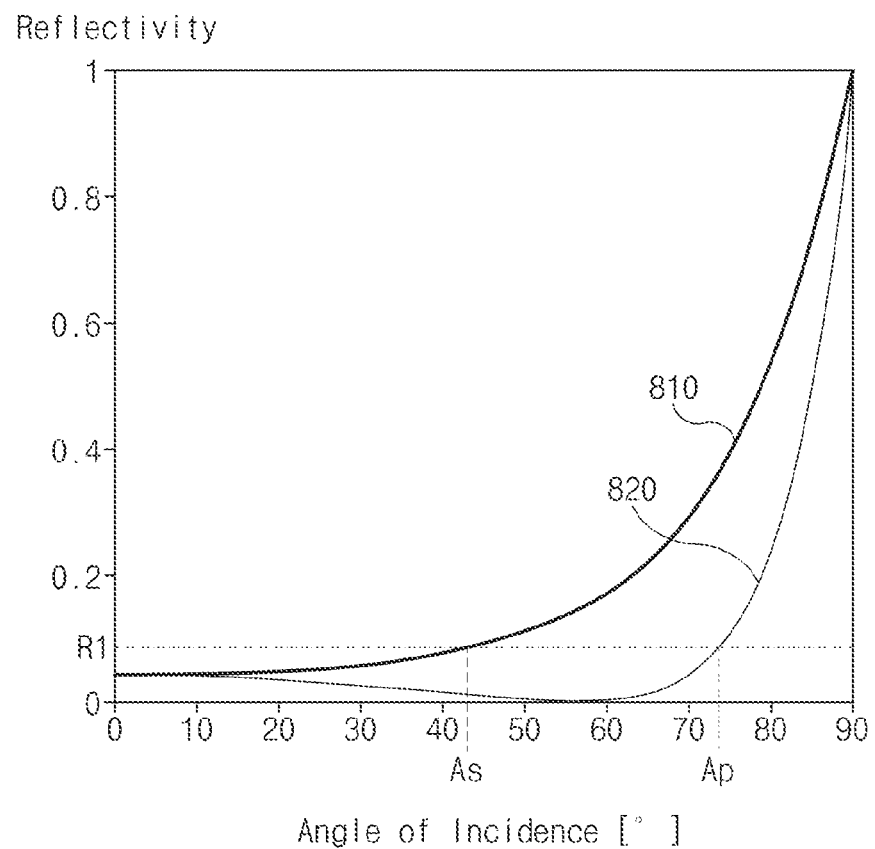
FIG. 8 is a graph illustrating reflectivity according to an angle of incidence of each of S-polarized light and P-polarized light according to various embodiments.

Referring to FIG. 8, in Fresnel reflection that occurs when light is incident on a boundary surface of two media having different optical properties, the reflectivity Rs of the S-polarized light and the reflectivity Rp of the P-polarized light may be defined by Equation 1 below, which is a Fresnel equation. In Equation 1, $n_1$ and $n_2$ may denote refractive indices of two media. $\theta_i$ may denote an angle of incidence, and $\theta_t$ may denote an angle of refraction.

$$R_s = \left| \frac{n_1 \cos\theta_i - n_2 \cos\theta_t}{n_1 \cos\theta_i + n_2 \cos\theta_t} \right|^2, \quad \text{[Equation 1]}$$

$$R_p = \left| \frac{n_1 \cos\theta_t - n_2 \cos\theta_i}{n_1 \cos\theta_t + n_2 \cos\theta_i} \right|^2$$

When light proceeds from the first medium to the second medium, the remaining light that is not reflected on the boundary surface may be transmitted to the second medium, and thus transmittance Ts of the S-polarized light and transmittance Tp of the P-polarized light may be defined by Equation 2 below.

$$T_s = 1 - R_s, T_p = 1 - R_p \quad \text{[Equation 2]}$$

Referring to Equation 1, Equation 2, and FIG. 8, the reflectivity Rs of the S-polarized light may be greater than the reflectivity Rp of the P-polarized light. Besides, the reflectivity Rs of the S-polarized light may be greater than the reflectivity Rp of the P-polarized light, and thus the transmittance Ts of the S-polarized light may be smaller than the transmittance Tp of the P-polarized light. When the light has transmittance that is not less than a specified value, the reflectivity may not be greater than a specified value (e.g., a first value R1).

Figure 7:
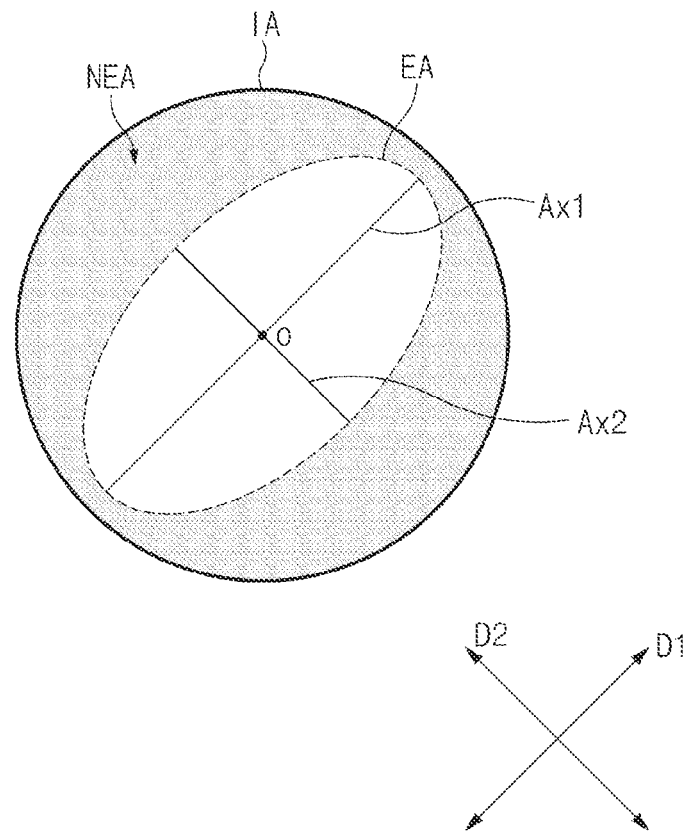
FIG. 7 is a diagram illustrating an enlarged view of the image region of FIG. 6 according to various embodiments.

Referring to FIGS. 6, 7 and 8, the electronic device according to an embodiment may generate (or obtain) an image by detecting light passing through the optical member 620. The amount of light passing through the optical member 620 may affect image quality. It is expressed that an image is dark as the amount of light passing through the optical member 620 decreases. Accordingly, the accuracy of biometric information may be lowered. When the amount of light passing through the optical member 620 is less than a predetermined value, the ineffective area NEA including an image to be difficultly used as biometric information may be formed. When the amount of light passing through the optical member 620 is not less than the predetermined value, the ineffective area NEA including an image capable of being used as biometric information may be formed. That is, when the reflectivity of the optical member 620 is not greater than a specified value (e.g., the first value R1), the effective area EA may be formed.

The reflectivity Rs of the S-polarized light may have the first value R1 at the first angle As of incidence. The reflectivity Rp of the P-polarized light may have the first value R1 at the second angle Ap of incidence. The maximum value of an angle of incidence of the S-polarized light capable of having reflectivity that is not greater than the first value R1 may be the first angle As of incidence, and the maximum value of an angle of incidence of the P-polarized light may be the second angle Ap of incidence. The second angle Ap of incidence may be greater than the first angle As of incidence. A range (0° to Ap) of an angle of incidence of the P-polarized light capable of having reflectivity that is not greater than the first value R1 may be greater than a range (0° to As) of an angle of incidence of the S-polarized light. In other words, the range (0° to Ap) of the angle of incidence of the P-polarized light capable of having transmittance that is not less than a specified value may be greater than the range (0° to As) of the angle of incidence of the S-polarized light.

The range (0° to Ap) of angle of incidence of the P-polarized light capable of having reflectivity that is not greater than the specified value (e.g., the first value R1) is greater than the range (0° to As) of the angle of incidence of the S-polarized light. Accordingly, in the effective area EA in the image area IA, a length in the first direction D1, for which a ratio of the P-polarized light is great, is greater than a length in the second direction D2, for which a ratio of the S-polarized light is great. For example, referring to FIG. 7, the effective area EA in the image area IA may have an elliptical shape including a major axis Ax1 in the first direction D1 and a minor axis Ax2 in the second direction D2. The length of the major axis Ax1 of the effective area EA and the length of the minor axis Ax2 of the effective area EA may be determined based on the angle of incidence of the S-polarized light and the angle of incidence of the P-polarized light, which have the reflectivity of a specified value (e.g., the first value R1). An area excluding the effective area EA in the image area IA may be the ineffective area NEA.

Figure 9:
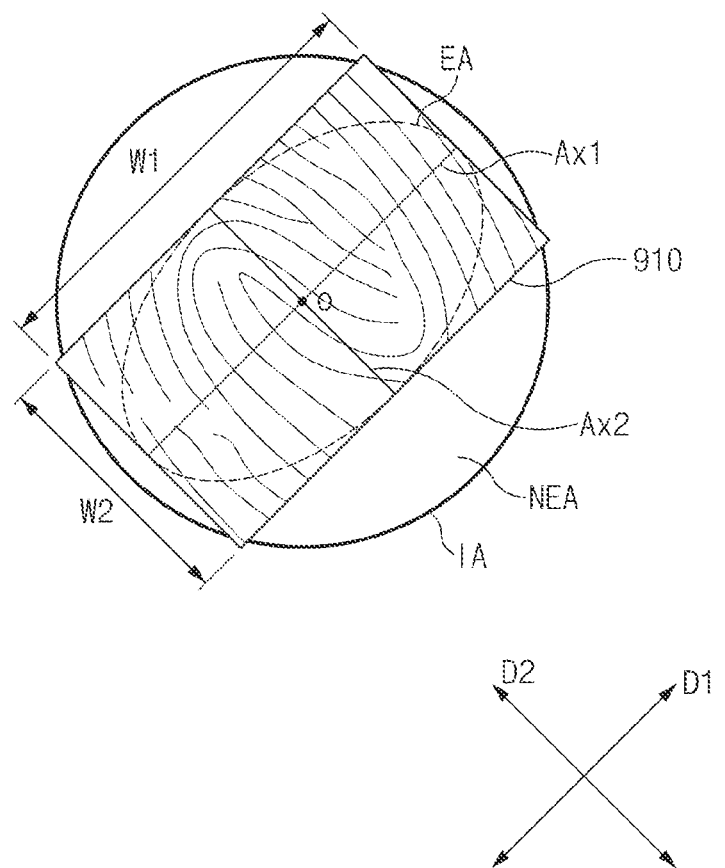
FIG. 9 is a diagram illustrating an example light receiving unit of a biometric sensor included in an electronic device, according to various embodiments.

FIG. 9 is a diagram illustrating an example light receiving unit of a biometric sensor included in an electronic device, according to various embodiments. For example, FIG. 9 may illustrate the light receiving unit of the biometric sensor viewed from a front direction of the electronic device according to an embodiment. Referring to FIG. 9, the biometric sensor (e.g., the biometric sensor 542 of FIG. 5) may have a length W1 in the first direction D1 and a length W2 in the second direction D2. The length W1 in the first direction D1 may be longer than the length W2 in the second direction D2. The first direction D1 may be a polarization axis direction of a polarization layer (e.g., the polarization layer 521 of FIG. 5) included in a display. For example, the first direction D1 may be a direction substantially parallel to the direction of the polarization axis (e.g., the polarization axis PA of FIG. 6) of the polarization layer. The length W1 of a light receiving unit 910 in the first direction D1 may correspond to the length of the long axis Ax1 of the effective area EA. The length W2 of the light receiving unit 910 in the second direction D2 may correspond to the length of the short axis Ax2 of the effective area EA. For example, the shape of the light receiving unit 910 may be rectangular. When the light receiving unit 910 has a rectangular shape, a long side of the light receiving unit 910 may extend in the first direction D1, and a short side of the light receiving unit 910 may extend in the second direction D2. In an electronic device according to an embodiment, the light receiving unit 910 of the biometric sensor includes a shape (e.g., rectangle), which is long in the first direction D1 (the polarization axis direction of a polarization layer) as compared to the second direction D2. Accordingly, the light receiving unit 910 of the biometric sensor may reduce an area corresponding to the ineffective area NEA of the image area IA in the light receiving unit 910, thereby improving the efficiency of the light receiving unit 910.

Figure 10:
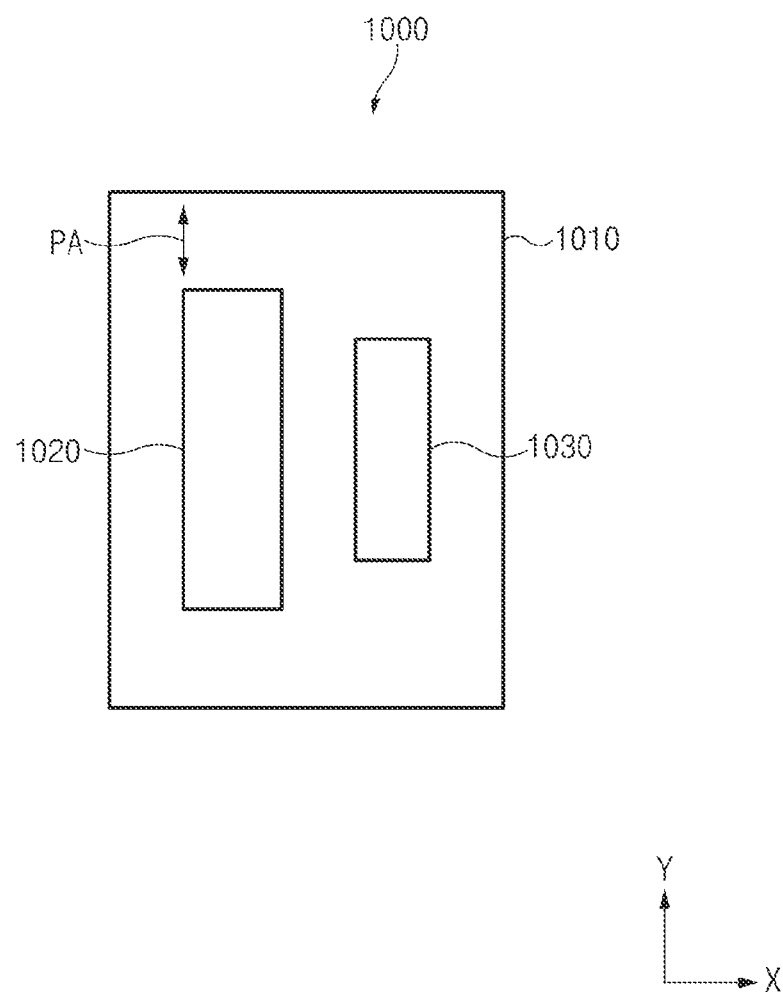
FIG. 10 is a diagram illustrating an example arrangement of some components in an electronic device, according to various embodiments.

FIG. 10 is a diagram illustrating an example arrangement of various components in the electronic device 1000, according to various embodiments. Referring to FIG. 10, an electronic device 1000 (e.g., the electronic device 100 of FIG. 1) may include a polarization layer 1010, a battery 1020, and a biometric sensor 1030 (or a light receiving unit of a biometric sensor). In the electronic device 1000 according to an embodiment, the battery 1020 and the biometric sensor 1030 may be aligned based on a direction of the polarization axis PA (e.g., Y axis direction) of the polarization layer 1010. For example, a long axis of the battery 1020 and a long axis of the biometric sensor 1030 may be aligned in the direction of the polarization axis PA (e.g., Y axis direction) of the polarization layer 1010. For example, the battery 1020 and the biometric sensor 1030 may be aligned such that long axes of the battery 1020 and the biometric sensor 1030 are substantially parallel to the direction of the polarization axis PA. The battery 1020 and the biometric sensor 1030 may be positioned side by side in a direction (e.g., X-axis direction) perpendicular to the direction of the polarization axis PA. For example, the biometric sensor 1030 may be located in a direction perpendicular to the direction of the polarization axis PA from the battery 1020. As another example, when the electronic device 1000 is viewed in a direction substantially perpendicular to the direction of the polarization axis PA (e.g., X axis direction), the battery 1020 and the biometric sensor 1030 may at least partially overlap each other. In an electronic device according to an embodiment, a space in the electronic device 1000 may be secured by aligning the battery 1020 and the biometric sensor 1030 based on the polarization axis PA. Besides, the battery 1020 that has a large size and large capacity may be arranged.

Hereinafter, an electronic device according to an embodiment will be described in greater detail below with reference to FIGS. 11 and 12.

Figure 11:
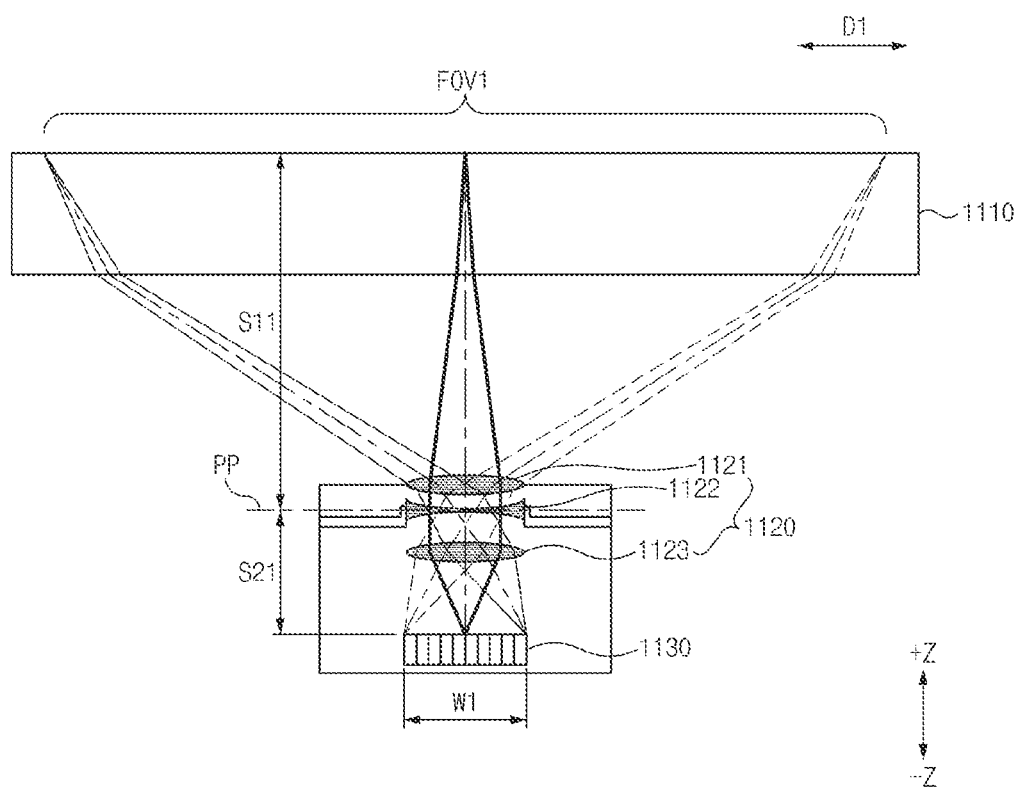
FIG. 11 is a cross-sectional view illustrating an electronic device, according to various embodiments.

FIG. 11 is a cross-sectional view of an electronic device in one direction (e.g., the first direction D1) according to various embodiments. FIG. 12 is a cross-sectional view of an electronic device in another direction (e.g., the second direction D2), according to various embodiments.

Figure 12:
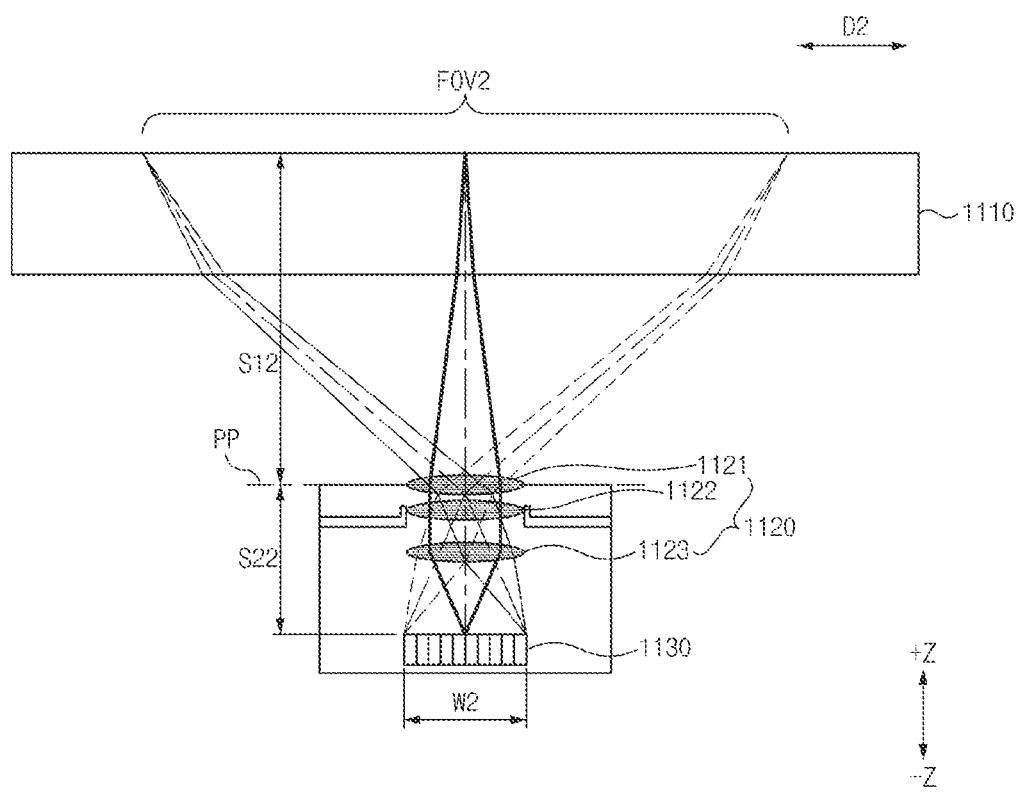
FIG. 12 is a cross-sectional view illustrating an electronic device in another direction, according to various embodiments.

Referring to FIGS. 11 and 12, an electronic device (e.g., the electronic device 100 of FIG. 1) according to an embodiment may include a display 1110, an optical member 1120 positioned under the display 1110 (e.g., −Z axis direction), and a light receiving unit 1130 of a biometric sensor (e.g., the biometric sensor 542 of FIG. 5). The display 1110 may include a polarization layer (e.g., the polarization layer 521 of FIG. 5).

The optical member 1120 may include a plurality of lenses (1121, 1122, 1123), which are arranged in a thickness direction of the display 1110. According to an embodiment, the optical member 1120 may include the first lens 1121, the second lens 1122, and the third lens 1123. FIGS. 11 and 12 illustrate that the optical member 1120 includes three lenses. However, the number and arrangement of lenses included in the optical member 1120 are not limited to those illustrated in FIGS. 11 and 12.

The plurality of lenses (1121, 1122, 1123) of the optical member 1120 may form one principal plane PP. The principal plane PP may refer, for example, to the principal plane PP of a virtual lens for an image obtained by the plurality of lenses (1121, 1122, 1123). For example, the principal plane PP may include an optical center of an optical system composed of the plurality of lenses (1121, 1122, 1123). A first distance (S11, S12) between the principal plane PP and an object and a second distance (S21, S22) between the principal plane PP and the light receiving unit 1130 of the biometric sensor that forms an image may vary depending on a location of the principal plane PP. The magnification of an image by the optical member 1120 may be determined based on the first distance (S11, S12) and the second distance (S21, S22). Accordingly, the magnification of the image by the optical member 1120 may be determined based on the location of the principal plane PP. For example, when the principal plane PP moves in a direction farther away from the light receiving unit 1130, the first distance (S11, S12) between the principal plane PP and the object may be shorter, and the second distance (S21, S22) between the principal plane PP and the light receiving unit 1130 may be longer. In this case, a field-of-view region (FOV1, FOV2) in which biometric information is capable of being detected may be narrowed.

The optical member 1120 of the electronic device according to an embodiment may include at least one asymmetric lens such that a location of the principal plane PP varies depending on a direction. The asymmetric lens may have at least two or more different curvatures. For example, one region of the asymmetric lens may have a first curvature, and another region of the asymmetric lens may have a second curvature different from the first curvature. In the electronic device according to an embodiment, the location of the principal plane PP in the first direction D1 may be disposed closer to the light receiving unit 1130 than the location of the principal plane PP in the second direction D2. When the location of the principal plane PP in the first direction D1 is positioned closer to the light receiving unit 1130 than the location of the principal plane PP in the second direction D2, the magnification in the first direction D1 may be greater than the magnification in the second direction D2, and the field-of-view region FOV1 in the first direction D1 may be wider than the field-of-view region FOV2 in the second direction D2. Accordingly, while the field-of-view region FOV1 in the first direction D1 having relatively-high transmittance is widely detected, the length W1 of the light receiving unit 1130 in the first direction D1 may be reduced.

Figure 13:
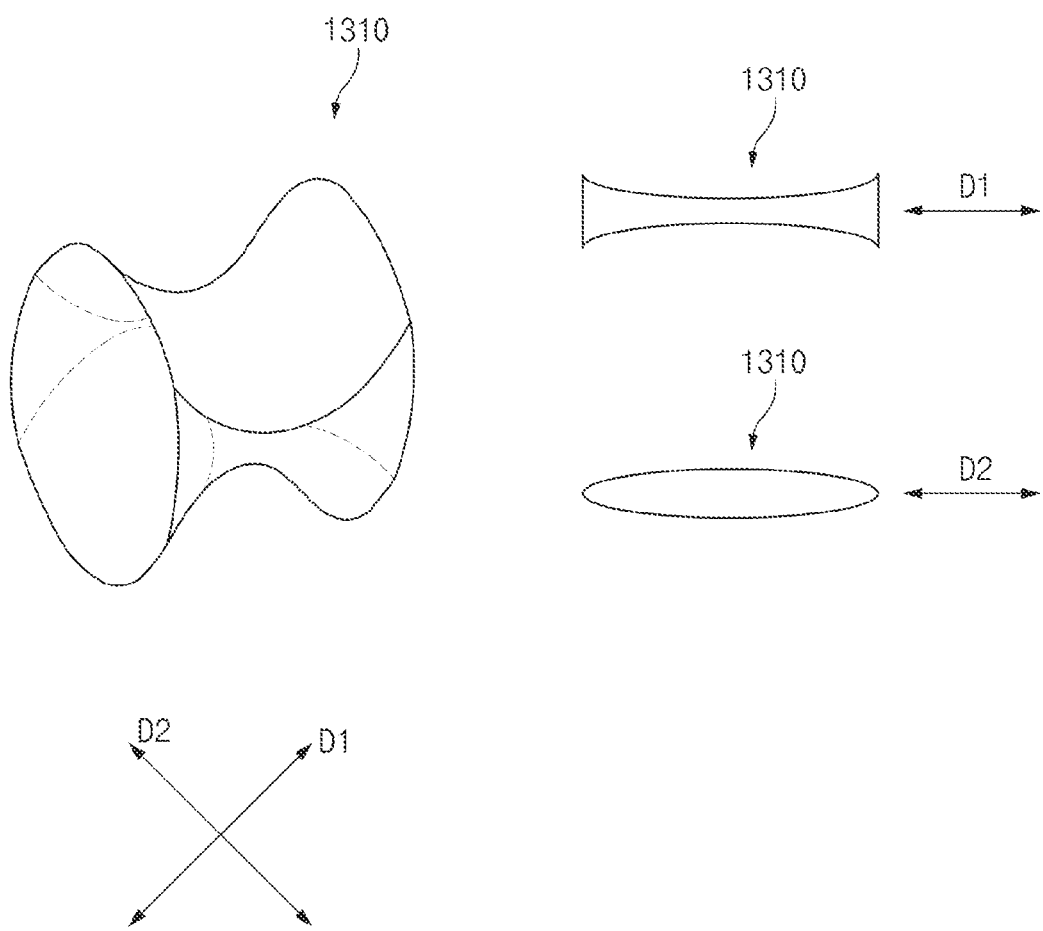
FIG. 13 is a diagram illustrating an example lens included in an optical member of an electronic device, according to various embodiments.

FIG. 13 is a diagram illustrating an example lens included in an optical member of an electronic device, according to various embodiments. A lens 1310 included in an optical member (e.g., the optical member 1120 of FIG. 11) of an electronic device (e.g., the electronic device 100 of FIG. 1) according to an embodiment may be an asymmetric lens. According to an embodiment, a curvature of the lens 1310 in the first direction D1 is different from a curvature of the lens 1310 in the second direction D2. The cross-section of the lens 1310 taken in the first direction D1 may be a cross-sectional shape of a concave lens. The cross-section of the lens 1310 taken in the second direction D2 may be a cross-sectional shape of a convex lens. The first direction D1 corresponding to the cross-sectional shape of the concave lens may be aligned in a polarization axis direction of a polarization layer included in a display. However, a shape of the lens 1310 is not limited to that illustrated in FIG. 13. For example, the lens 1310 may include different curvatures in at least two directions.

Figure 14:
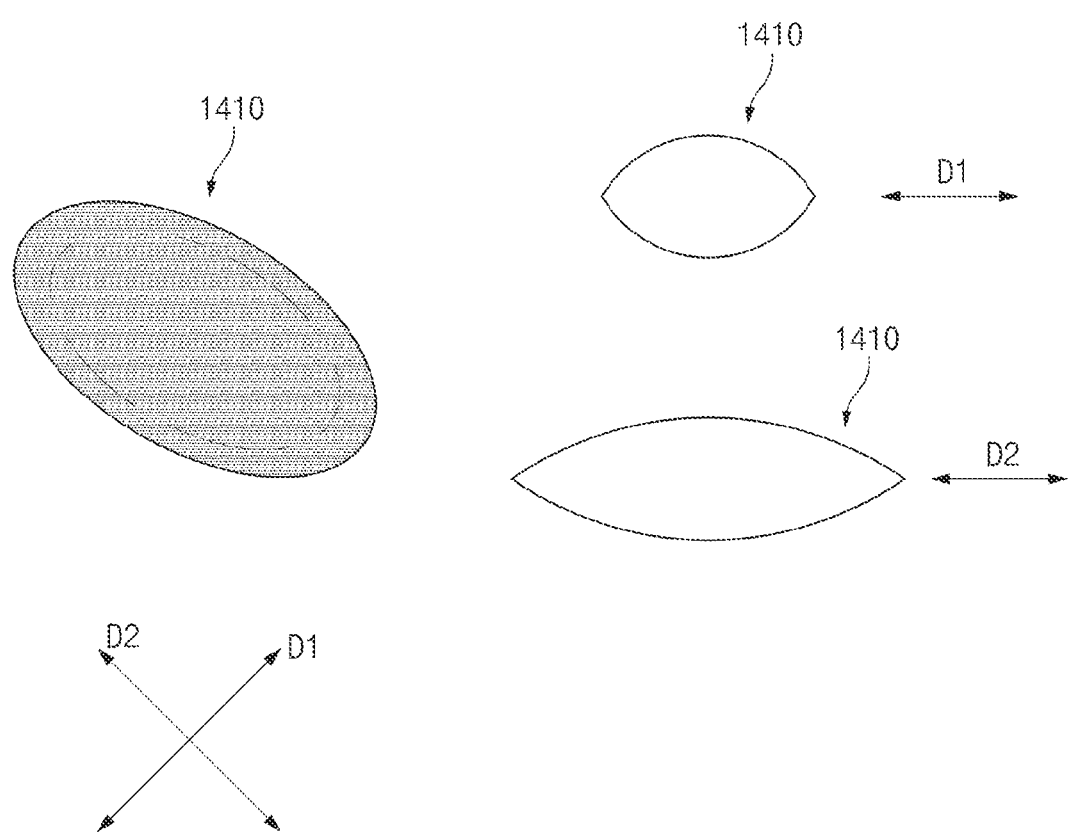
FIG. 14 is a diagram illustrating an example lens included in an optical member of an electronic device, according to various embodiments.

FIG. 14 is a diagram illustrating an example lens included in an optical member of an electronic device, according to an embodiment. A lens 1410 included in an optical member of an electronic device (e.g., the electronic device 100 of FIG. 1) according to an embodiment may be an asymmetric lens. According to an embodiment, a curvature of the lens 1410 in the first direction D1 is different from a curvature of the lens 1410 in the second direction D2. A curvature of the lens 1410 in the first direction D1 may be greater than a curvature of the lens 1410 in the second direction D2.

Hereinafter, a light receiving unit of a biometric sensor (e.g., the biometric sensor 542 of FIG. 5) included in the electronic device according to an embodiment, and an image obtained through the light receiving unit will be described in greater detail below with reference to FIGS. 11, 12, and 15.

Figure 15:
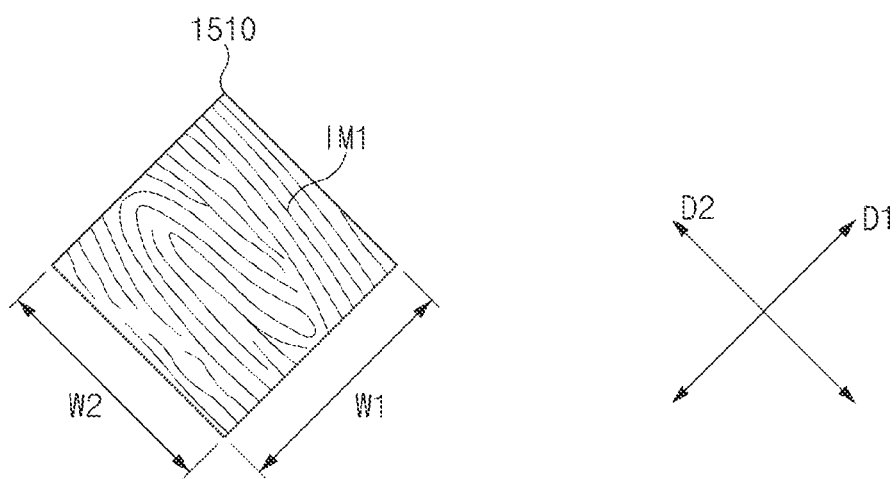
FIG. 15 is a diagram illustrating an example light receiving unit of a biometric sensor included in an electronic device, according to various embodiments.

FIG. 15 is a diagram illustrating an example light receiving unit of a biometric sensor included in an electronic device, according to various embodiments.

In an electronic device according to an embodiment, a magnification of the optical member 1120 in the first direction D1 may be greater than a magnification of the optical member 1120 in the second direction D2. In this case, an image magnification of a raw image IM1 in the first direction D1, which is generated based on light obtained through a light receiving unit 1510, may be greater than image magnification of the raw image IM1 in the second direction D2. The Image magnification may mean a ratio of an area of an object corresponding to an image to an area of the corresponding image. A length W1 of the light receiving unit 1510 of FIG. 15 in the first direction D1 may be smaller than the length W1 of the light receiving unit 910 of the electronic device according to the embodiment of FIG. 9 in the first direction D1. For example, the light receiving unit 1510 may have a square shape in which the length W1 in the first direction D1 is the same as a length W2 in the second direction D2. However, in the light receiving unit 1510, the length W1 in the first direction D1 may be different from the length W2 in the second direction D2. In an electronic device according to an embodiment, a region of an object in the first direction D1, which corresponds to the obtained image, as compared to the length W1 of the light receiving unit 1510 in the first direction D1 may be wider than a region of the object in the second direction D2, which corresponds to the obtained image, as compared to the length W2 in the second direction D2. The region of the object in the first direction D1, which corresponds to the obtained image, as compared to the length of the raw image IM1, which is obtained through the light receiving unit 1510, in the first direction D1 may be wider than the region of the object in the second direction D2, which corresponds to the obtained image, as compared to the length of the raw image IM1 in the second direction D2. For example, the raw image IM1 may be an image indicating that an image of the object is distorted in one direction.

A second image IM2 (e.g., a fingerprint image) obtained by correcting the first image IM1 (e.g., the raw image) will be described in greater detail below with reference to FIG. 16.

Figure 16:
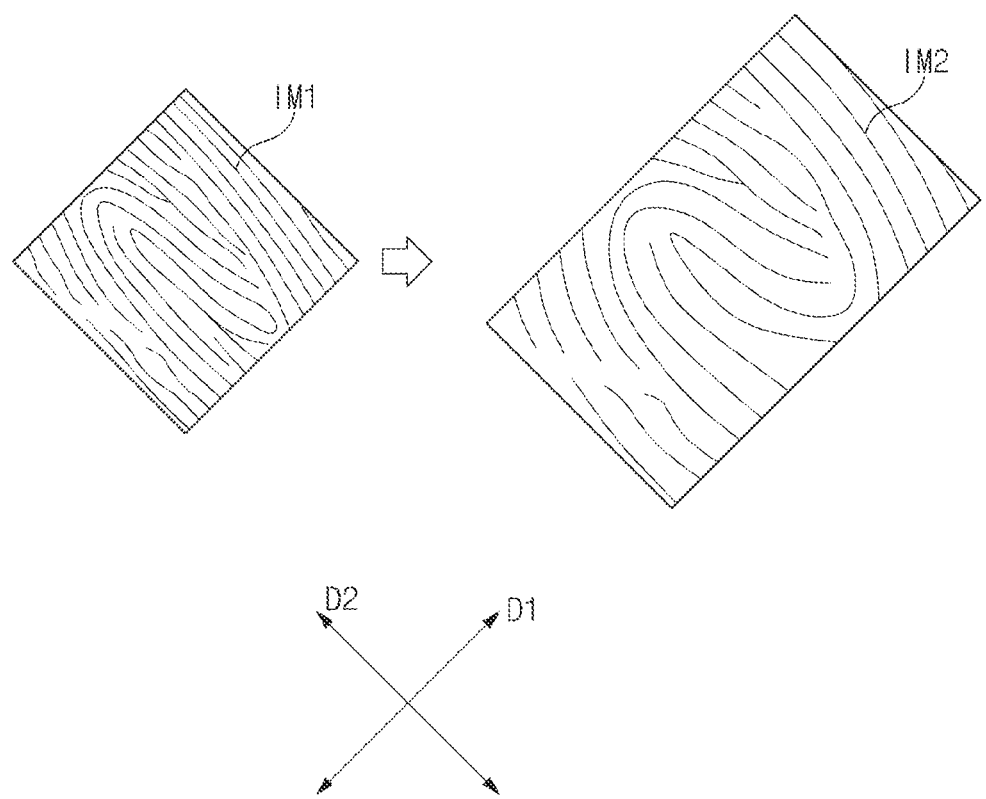
FIG. 16 is a diagram illustrating an example first image and a second image according to various embodiments.

FIG. 16 is a diagram illustrating a first image and a second image according to various embodiments.

Referring to FIG. 16, an electronic device according to an embodiment may obtain the second image IM2, in which the same or similar image magnification is maintained in all regions, by correcting the first image IM1. The first image IM1 may be an image having high magnification in the first direction D1 and low magnification in the second direction D2. The electronic device according to an embodiment may correct an image such that all regions of the image have the same magnification, based on the magnification information according to a circumferential angle of the first image IM1. A ratio of a length of the first image IM1 in the first direction D1 to a length of the first image IM1 in the second direction D2 may be different from a ratio of a length of the second image IM2 in the first direction D1 to a length of the second image IM2 in the second direction D2. The length of the second image IM2 in the first direction D1 may be longer than the length of the first image IM1 in the first direction D1.

Hereinafter, an example method of operating an electronic device will be described in greater detail below with reference to FIG. 17.

Figure 17:
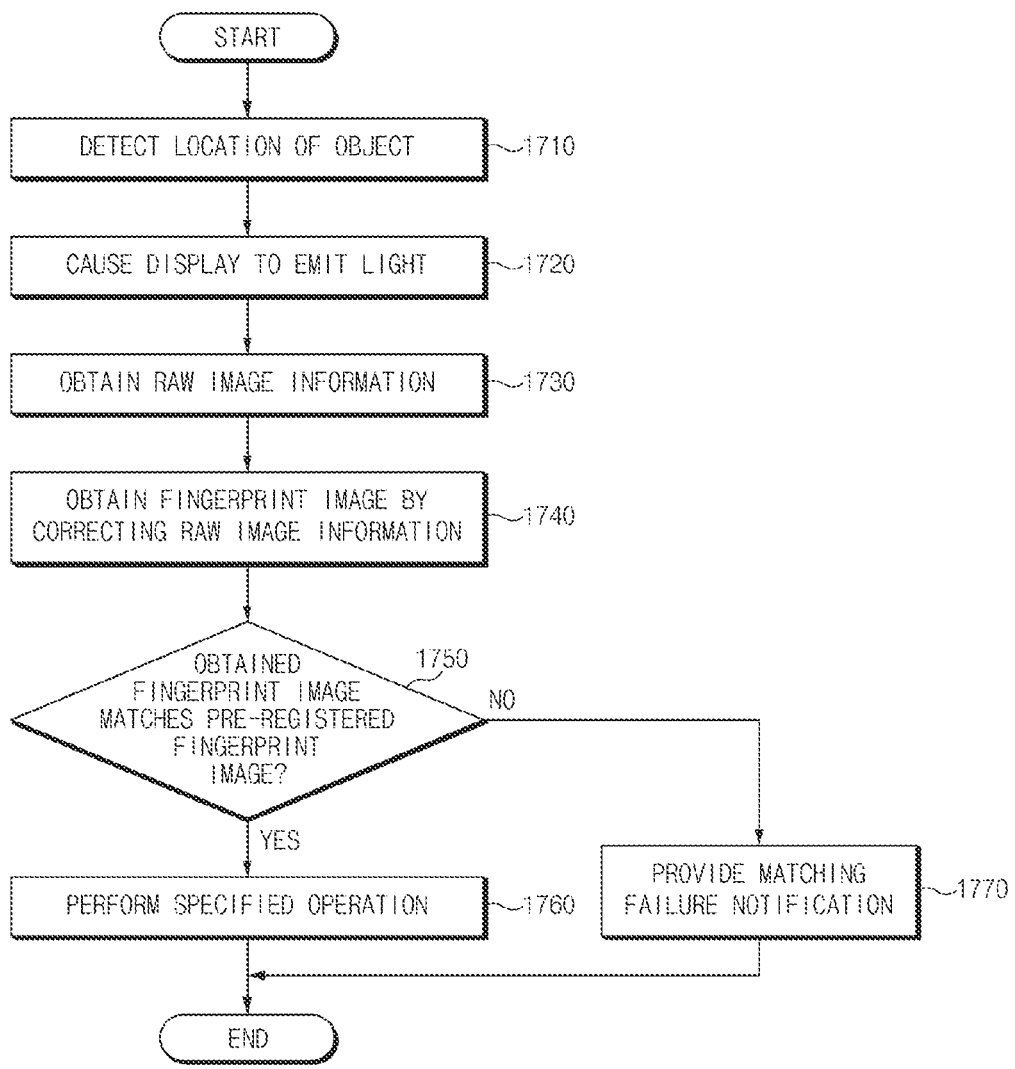
FIG. 17 is a flowchart illustrating an example method of operating an electronic device, according to various embodiments.

FIG. 17 is a flowchart illustrating an example operation of an electronic device (e.g., electronic device 100 of FIG. 1 or an electronic device 1901 of FIG. 19), according to various embodiments. Hereinafter, an operation of an electronic device may be referred to as an operation of a processor (e.g., the processor 1920 of FIG. 19).

In operation 1710, the electronic device may detect a location of an object (e.g., a finger). For example, an electronic device may detect a touch of the object through a touch panel.

In operation 1720, the electronic device may cause a region (e.g., the sensing region 139 of FIG. 3) of a display (e.g., the display 130 of FIG. 3) to emit light. The electronic device according to an embodiment may cause the display region corresponding to a location of the object to emit light, based on the location detection of the object (e.g., a finger).

In operation 1730, the electronic device may obtain raw image information (e.g., the first image IM1 of FIG. 16) using a biometric sensor (e.g., the biometric sensor 542 of FIG. 5). For example, light that is emitted from the display and then is reflected by the object (e.g., a finger) may pass through a polarization layer (e.g., the polarization layer 521 of FIG. 5) and an optical member (e.g., the optical member 541 of FIG. 5) included in the display and then may reach the biometric sensor. The location of a principal plane by the optical member may vary depending on a direction. The optical member may include a magnification different depending on the direction. For example, the optical member may include the highest magnification in the first direction, which is a polarization axis direction of a polarization layer of the display. The magnification in the first direction, which is the polarization axis direction of the polarization layer of the display of the optical member, may be greater than the magnification in the second direction across the first direction. The biometric sensor may include a light receiving unit capable of detecting light that is reflected by the object and then passes through the optical member. The electronic device according to an embodiment may obtain (or generate) the raw image information using light detected by the biometric sensor. The raw image information may include an image of an image magnification different depending on the direction. For example, a region of the object included in an image in the first direction may be greater than a region of the object included in the image in the second direction.

In operation 1740, the electronic device may obtain (or generate) a fingerprint image (e.g., the second image IM2 of FIG. 16) by correcting the raw image information. The electronic device may correct the raw image information such that all regions of the image have the same image magnification and then may generate the fingerprint image. For example, the electronic device may correct the raw image based on magnification information according to a circumferential angle of the raw image information.

In operation 1750, the electronic device may compare the obtained fingerprint image with a pre-registered fingerprint image. For example, the electronic device may determine whether the obtained fingerprint image matches the pre-registered fingerprint image.

When it is determined that the obtained fingerprint image matches the pre-registered fingerprint image, in operation 1760, the electronic device may perform a specified operation (e.g., execution of user authentication, a specified operation, a function, or an application).

When it is determined that the obtained fingerprint image does not match the pre-registered fingerprint image, in operation 1770, the electronic device may provide a user with a matching failure notification. For example, the electronic device may provide the user with a notification or feedback indicating that fingerprint authentication has failed, through an output device (e.g., a display module 1960, a sound output module 1955, an audio module 1970, and/or a haptic module 1979 in FIG. 19 or the display 130 of FIG. 3).

A method for obtaining biometric information of an electronic device according to an example embodiment may include: detecting a touch of an object, emitting light through one region of a display including a polarization layer based on the touch of the object, obtaining a raw image having an image magnification that is different depending on a direction, based on light that is emitted from the display, reflected on the object, and incident on a light receiving unit of a biometric sensor, and obtaining biometric information by correcting the raw image such that all regions of the raw image have an identical image magnification.

The method for obtaining biometric information of the electronic device according to an example embodiment may include correcting the raw image and obtaining the biometric information based on magnification information according to a circumferential angle of the raw image.

According to an example embodiment, in the raw image, an image magnification in a first direction, which is a polarization axis direction of the polarization layer, may be greater than an image magnification in a second direction across the first direction.

Figure 18:
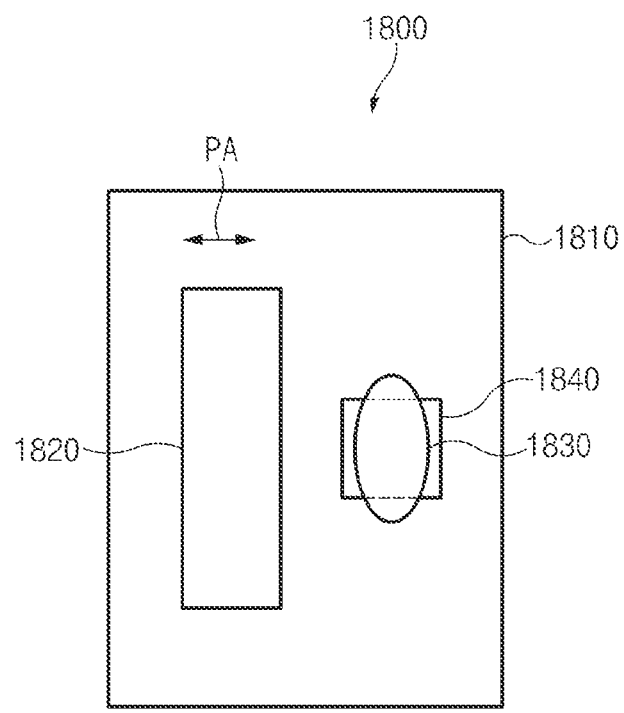
FIG. 18 is a diagram illustrating an example arrangement of some components in an electronic device, according to various embodiments.

FIG. 18 is a diagram illustrating an example arrangement of various components in the electronic device 1800, according to various embodiments. Referring to FIG. 18, an electronic device 1800 (e.g., the electronic device 100 of FIG. 1) may include a polarization layer 1810, a battery 1820, an optical member (e.g., including a light condenser) 1830, and a biometric sensor 1840 (or a light receiving unit of a biometric sensor). In the electronic device 1800 according to an embodiment, the battery 1820, the optical member 1830, and the biometric sensor 1840 may be aligned based on a direction of the polarization axis PA (e.g., Y axis direction) of the polarization layer 1810.

For example, the shape of the optical member 1830 may be elliptical. In the electronic device 1800 according to an embodiment, a long axis of the battery 1820 and a long axis of the optical member 1830 may be aligned in a direction (e.g., Y axis direction) perpendicular to a direction of the polarization axis (PA) of the polarization layer 1810. For example, the battery 1820 and the optical member 1830 may be aligned such that long axes of the battery 1820 and the optical member 1830 are substantially parallel to a direction perpendicular to the direction of the polarization axis PA. According to an embodiment, the shape of the biometric sensor 1840 may be rectangular. One side of the biometric sensor 1840 may be aligned with the long axis of the battery 1820 and the long axis of the optical member 1830 in a direction (e.g., Y axis direction) perpendicular to the direction of the polarization axis PA. For example, the biometric sensor 1840 may be positioned such that one side of the biometric sensor 1840 facing the battery 1820 is substantially parallel to a direction perpendicular to the direction of the polarization axis PA. In the electronic device according to an embodiment, a space in the electronic device 1800 may be secured by aligning the battery 1820, the optical member 1830, and the biometric sensor 1840 based on the direction of the polarization axis PA. Besides, the battery 1820 that has a large size and large capacity may be arranged.

According to an example embodiment, an electronic device may include: a display (e.g., the display 420 of FIG. 4) including a polarization layer (e.g., the polarization layer 610 of FIG. 6), a biometric sensor (e.g., the biometric sensor 440 of FIG. 4) positioned to at least partially overlap the display, and an optical member (e.g., the optical member 430 of FIG. 4) comprising a light condenser positioned between the display and the biometric sensor. The biometric sensor may include a light receiving unit (e.g., the light receiving unit 910 of FIG. 9) including light receiving circuitry configured to receive light emitted from the display and reflected by an external object (e.g., the object 460 of FIG. 4). A length of the light receiving unit in a first direction, which is a polarization axis direction of the polarization layer, is greater than a length of the light receiving unit in a second direction crossing the first direction.

According to an example embodiment, a shape of the light receiving unit may be rectangular.

According to an example embodiment, the electronic device may further include the battery. A long axis of the light receiving unit and a long axis of the battery are aligned in the first direction.

According to an example embodiment, the optical member may include a plurality of lenses (e.g., lenses 1121, 1122, 1123 of FIG. 11). A location of a principal plane (e.g., the principal plane PP of FIG. 10) of the optical member in the first direction may be different from a location of the principal plane of the optical member in the second direction.

According to an example embodiments, a distance (e.g., the distance S21 of FIG. 11) between the principal plane of the optical member in the first direction and the light receiving unit may be less than a distance (e.g., the distance S22 of FIG. 11) between the principal plane of the optical member in the second direction and the light receiving unit.

According to an example embodiment, a magnification of the optical member in the first direction may be greater than a magnification in the second direction.

According to an example embodiment, at least one of the plurality of lenses may be an asymmetric lens (e.g., the lens 1310 of FIG. 13 and/or the lens 1410 of FIG. 14) in which a curvature in the first direction is different from a curvature in the second direction.

According to an example embodiment, a cross-section of the asymmetric lens in the first direction may have a cross-sectional shape of a concave lens, and a cross-section of the asymmetric lens in the second direction may have a cross-section of a convex lens.

According to an example embodiment, the electronic device may further include a processor (e.g., the processor 410 of FIG. 4) operatively connected to the display and the biometric sensor. The processor may be configured to: detect a touch of the object, to cause one region of the display to emit light based on the touch of the object, to obtain a raw image of an image magnification, the image magnification being different depending on a direction, based on light incident on the light receiving unit using the biometric sensor, and obtain a fingerprint image by correcting the raw image such that all regions of the raw image have an identical image magnification.

According to an example embodiment, the processor may be configured to correct the raw image based on magnification information according to a circumferential angle of the raw image.

According to an example embodiment, the processor may be configured to compare the obtained fingerprint image with a pre-registered fingerprint image and to perform a specified operation based on determining that the obtained fingerprint image matches the pre-registered fingerprint image.

According to an example embodiment, the electronic device may further include a battery. A shape of one of the plurality of lenses may be elliptical. A long axis of the battery may be aligned with a long axis of one of the plurality of lenses in the second direction.

According to an example embodiment, an electronic device may include: a display including a polarization layer, a biometric sensor positioned to at least partially overlap the display, and an optical member including a light condenser positioned between the display and the biometric sensor. The optical member may include an asymmetric lens having a curvature in a first direction different from a curvature in a second direction. The biometric sensor may include a light receiving unit including light receiving circuitry configured to receive light emitted from the display and reflected by an external object.

According to an example embodiment, the optical member may include a plurality of lenses. A location of a principal plane of the optical member in the first direction is different from a location of the principal plane in the second direction.

According to an example embodiment, the first direction may be a polarization axis direction of the polarization layer. A magnification of the optical member in the first direction may be greater than a magnification in the second direction.

According to an example embodiment, a field-of-view region in the first direction may be wider than a field-of-view region in the second direction.

According to an example embodiment, the electronic device may further include a processor operatively connected to the display and the biometric sensor. The processor may be configured to: detect a touch of the object, cause one region of the display to emit light based on the touch of the object, obtain a raw image of an image magnification different depending on a direction, based on the light emitted from the display, reflected on the object, and incident on the light receiving unit, using the biometric sensor, and obtain a fingerprint image by correcting the raw image such that all regions of the raw image have an identical image magnification.

Figure 19:
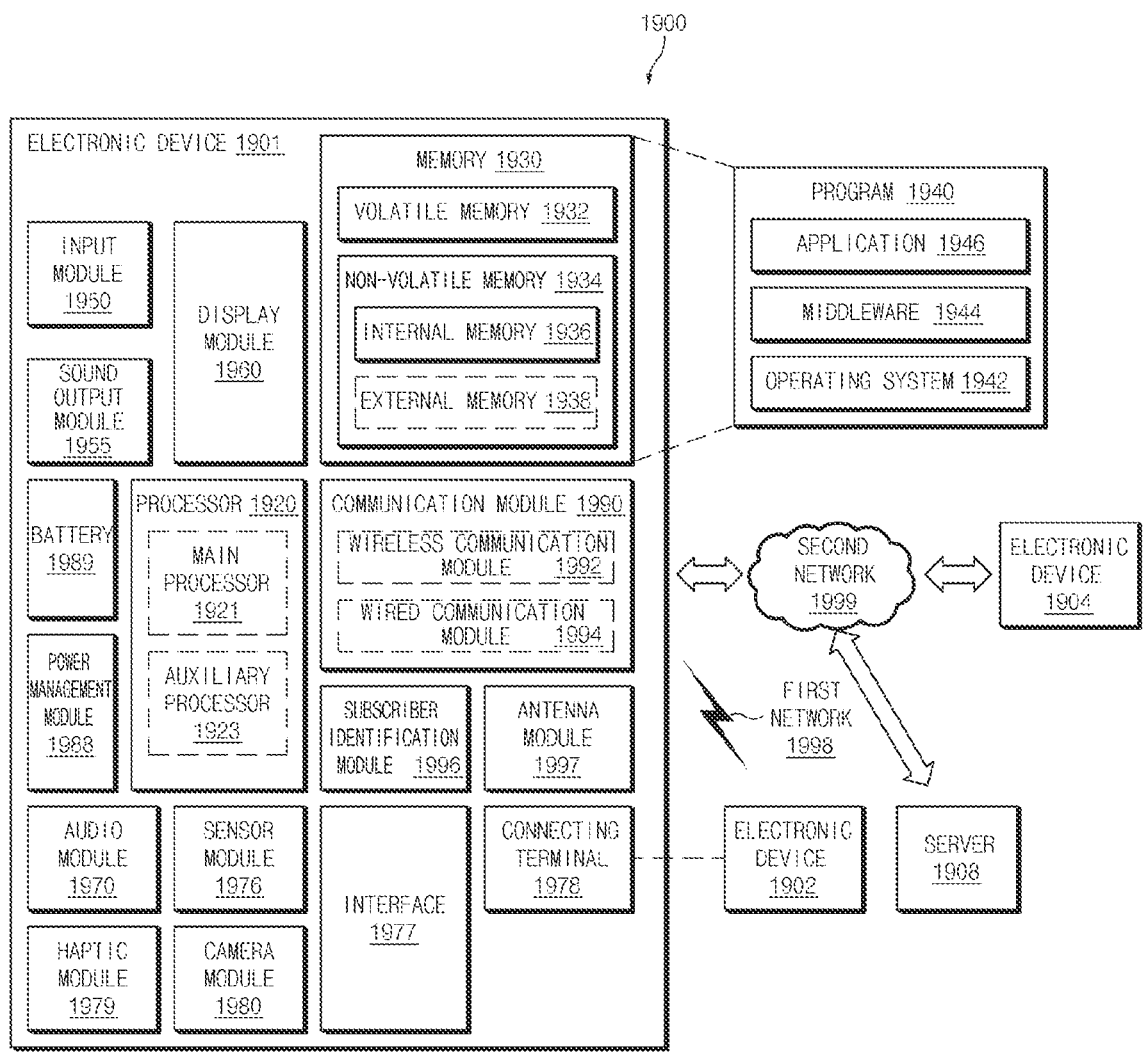
FIG. 19 is a block diagram illustrating an example electronic device in a network environment according to various embodiments.

FIG. 19 is a block diagram illustrating an example electronic device 1901 in a network environment 1900 according to an embodiment. Referring to FIG. 19, the electronic device 1901 in the network environment 1900 may communicate with an electronic device 1902 via a first network 1998 (e.g., a short-range wireless communication network), or at least one of an electronic device 1904 or a server 1908 via a second network 1999 (e.g., a long-range wireless communication network). According to an embodiment, the electronic device 1901 may communicate with the electronic device 1904 via the server 1908. According to an embodiment, the electronic device 1901 may include a processor 1920, memory 1930, an input module 1950, a sound output module 1955, a display module 1960, an audio module 1970, a sensor module 1976, an interface 1977, a connecting terminal 1978, a haptic module 1979, a camera module 1980, a power management module 1988, a battery 1989, a communication module 1990, a subscriber identification module (SIM) 1996, or an antenna module 1997. In various embodiments, at least one of the components (e.g., the connecting terminal 1978) may be omitted from the electronic device 1901, or one or more other components may be added in the electronic device 1901. In various embodiments, some of the components (e.g., the sensor module 1976, the camera module 1980, or the antenna module 1997) may be implemented as a single component (e.g., the display module 1960).

The processor 1920 may execute, for example, software (e.g., a program 1940) to control at least one other component (e.g., a hardware or software component) of the electronic device 1901 coupled with the processor 1920, and may perform various data processing or computation. According to an embodiment, as at least part of the data processing or computation, the processor 1920 may store a command or data received from another component (e.g., the sensor module 1976 or the communication module 1990) in volatile memory 1932, process the command or the data stored in the volatile memory 1932, and store resulting data in non-volatile memory 1934. According to an embodiment, the processor 1920 may include a main processor 1921 (e.g., a central processing unit (CPU) or an application processor (AP)), or an auxiliary processor 1923 (e.g., a graphics processing unit (GPU), a neural processing unit (NPU), an image signal processor (ISP), a sensor hub processor, or a communication processor (CP)) that is operable independently from, or in conjunction with, the main processor 1921. For example, when the electronic device 1901 includes the main processor 1921 and the auxiliary processor 1923, the auxiliary processor 1923 may be adapted to consume less power than the main processor 1921, or to be specific to a specified function. The auxiliary processor 1923 may be implemented as separate from, or as part of the main processor 1921.

The auxiliary processor 1923 may control at least some of functions or states related to at least one component (e.g., the display module 1960, the sensor module 1976, or the communication module 1990) among the components of the electronic device 1901, instead of the main processor 1921 while the main processor 1921 is in an inactive (e.g., sleep) state, or together with the main processor 1921 while the main processor 1921 is in an active state (e.g., executing an application). According to an embodiment, the auxiliary processor 1923 (e.g., an image signal processor or a communication processor) may be implemented as part of another component (e.g., the camera module 1980 or the communication module 1990) functionally related to the auxiliary processor 1923. According to an embodiment, the auxiliary processor 1923 (e.g., the neural processing unit) may include a hardware structure specified for artificial intelligence model processing. An artificial intelligence model may be generated by machine learning. Such learning may be performed, e.g., by the electronic device 1901 where the artificial intelligence is performed or via a separate server (e.g., the server 1908). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1930 may store various data used by at least one component (e.g., the processor 1920 or the sensor module 1976) of the electronic device 1901. The various data may include, for example, software (e.g., the program 1940) and input data or output data for a command related thereto. The memory 1930 may include the volatile memory 1932 or the non-volatile memory 1934.

The program 1940 may be stored in the memory 1930 as software, and may include, for example, an operating system (OS) 1942, middleware 1944, or an application 1946.

The input module 1950 may receive a command or data to be used by another component (e.g., the processor 1920) of the electronic device 1901, from the outside (e.g., a user) of the electronic device 1901. The input module 1950 may include, for example, a microphone, a mouse, a keyboard, a key (e.g., a button), or a digital pen (e.g., a stylus pen).

The sound output module 1955 may output sound signals to the outside of the electronic device 1901. The sound output module 1955 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1960 may visually provide information to the outside (e.g., a user) of the electronic device 1901. The display module 1960 may include, for example, a display, a hologram device, or a projector and control circuitry to control a corresponding one of the display, hologram device, and projector. According to an embodiment, the display module 1960 may include a touch sensor adapted to detect a touch, or a pressure sensor adapted to measure the intensity of force incurred by the touch.

The audio module 1970 may convert a sound into an electrical signal and vice versa. According to an embodiment, the audio module 1970 may obtain the sound via the input module 1950, or output the sound via the sound output module 1955 or a headphone of an external electronic device (e.g., an electronic device 1902) directly (e.g., wiredly) or wirelessly coupled with the electronic device 1901.

The sensor module 1976 may detect an operational state (e.g., power or temperature) of the electronic device 1901 or an environmental state (e.g., a state of a user) external to the electronic device 1901, and then generate an electrical signal or data value corresponding to the detected state. According to an embodiment, the sensor module 1976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1977 may support one or more specified protocols to be used for the electronic device 1901 to be coupled with the external electronic device (e.g., the electronic device 1902) directly (e.g., wiredly) or wirelessly. According to an embodiment, the interface 1977 may include, for example, a high definition multimedia interface (HDMI), a universal serial bus (USB) interface, a secure digital (SD) card interface, or an audio interface.

A connecting terminal 1978 may include a connector via which the electronic device 1901 may be physically connected with the external electronic device (e.g., the electronic device 1902). According to an embodiment, the connecting terminal 1978 may include, for example, a HDMI connector, a USB connector, a SD card connector, or an audio connector (e.g., a headphone connector).

The haptic module 1979 may convert an electrical signal into a mechanical stimulus (e.g., a vibration or a movement) or electrical stimulus which may be recognized by a user via his tactile sensation or kinesthetic sensation. According to an embodiment, the haptic module 1979 may include, for example, a motor, a piezoelectric element, or an electric stimulator.

The camera module 1980 may capture a still image or moving images. According to an embodiment, the camera module 1980 may include one or more lenses, image sensors, image signal processors, or flashes.

The power management module 1988 may manage power supplied to the electronic device 1901. According to an embodiment, the power management module 1988 may be implemented as at least part of, for example, a power management integrated circuit (PMIC).

The battery 1989 may supply power to at least one component of the electronic device 1901. According to an embodiment, the battery 1989 may include, for example, a primary cell which is not rechargeable, a secondary cell which is rechargeable, or a fuel cell.

The communication module 1990 may support establishing a direct (e.g., wired) communication channel or a wireless communication channel between the electronic device 1901 and the external electronic device (e.g., the electronic device 1902, the electronic device 1904, or the server 1908) and performing communication via the established communication channel. The communication module 1990 may include one or more communication processors that are operable independently from the processor 1920 (e.g., the application processor (AP)) and supports a direct (e.g., wired) communication or a wireless communication. According to an embodiment, the communication module 1990 may include a wireless communication module 1992 (e.g., a cellular communication module, a short-range wireless communication module, or a global navigation satellite system (GNSS) communication module) or a wired communication module 1994 (e.g., a local area network (LAN) communication module or a power line communication (PLC) module). A corresponding one of these communication modules may communicate with the external electronic device via the first network 1998 (e.g., a short-range communication network, such as Bluetooth™, wireless-fidelity (Wi-Fi) direct, or infrared data association (IrDA)) or the second network 1999 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1992 may identify and authenticate the electronic device 1901 in a communication network, such as the first network 1998 or the second network 1999, using subscriber information (e.g., international mobile subscriber identity (IMSI)) stored in the subscriber identification module 1996.

The wireless communication module 1992 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1992 may support a high-frequency band (e.g., the mmWave band) to achieve, e.g., a high data transmission rate. The wireless communication module 1992 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1992 may support various requirements specified in the electronic device 1901, an external electronic device (e.g., the electronic device 1904), or a network system (e.g., the second network 1999). According to an embodiment, the wireless communication module 1992 may support a peak data rate (e.g., 20 Gbps or more) for implementing eMBB, loss coverage (e.g., 1964 dB or less) for implementing mMTC, or U-plane latency (e.g., 0.5 ms or less for each of downlink (DL) and uplink (UL), or a round trip of 19 ms or less) for implementing URLLC.

The antenna module 1997 may transmit or receive a signal or power to or from the outside (e.g., the external electronic device) of the electronic device 1901. According to an embodiment, the antenna module 1997 may include an antenna including a radiating element including a conductive material or a conductive pattern formed in or on a substrate (e.g., a printed circuit board (PCB)). According to an embodiment, the antenna module 1997 may include a plurality of antennas (e.g., array antennas). In such a case, at least one antenna appropriate for a communication scheme used in the communication network, such as the first network 1998 or the second network 1999, may be selected, for example, by the communication module 1990 (e.g., the wireless communication module 1992) from the plurality of antennas. The signal or the power may then be transmitted or received between the communication module 1990 and the external electronic device via the selected at least one antenna. According to an embodiment, another component (e.g., a radio frequency integrated circuit (RFIC)) other than the radiating element may be additionally formed as part of the antenna module 1997.

According to an embodiment, the antenna module 1997 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1901 and the external electronic device 1904 via the server 1908 coupled with the second network 1999. Each of the electronic devices 1902 or 1904 may be a device of a same type as, or a different type, from the electronic device 1901. According to an embodiment, all or some of operations to be executed at the electronic device 1901 may be executed at one or more of the external electronic devices 1902, 1904, or 1908. For example, if the electronic device 1901 should perform a function or a service automatically, or in response to a request from a user or another device, the electronic device 1901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1901. The electronic device 1901 may provide the outcome, with or without further processing of the outcome, as at least part of a reply to the request. To that end, a cloud computing, distributed computing, mobile edge computing (MEC), or client-server computing technology may be used, for example. The electronic device 1901 may provide ultra low-latency services using, e.g., distributed computing or mobile edge computing. In an embodiment, the external electronic device 1904 may include an internet-of-things (IoT) device. The server 1908 may be an intelligent server using machine learning and/or a neural network. According to an embodiment, the external electronic device 1904 or the server 1908 may be included in the second network 1999. The electronic device 1901 may be applied to intelligent services (e.g., smart home, smart city, smart car, or healthcare) based on 5G communication technology or IoT-related technology.

The electronic device according to an embodiment may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that an embodiment of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with an embodiment of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

An embodiment as set forth herein may be implemented as software (e.g., the program 1940) including one or more instructions that are stored in a storage medium (e.g., internal memory 1936 or external memory 1938) that is readable by a machine (e.g., the electronic device 1901). For example, a processor (e.g., the processor 1920) of the machine (e.g., the electronic device 1901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities, and some of the multiple entities may be separately disposed in different components. According to an embodiment, one or more of the above-described components may be omitted, or one or more other components may be added. Alternatively or additionally, a plurality of components (e.g., modules or programs) may be integrated into a single component. In such a case, according to an embodiment, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a display including a polarization layer;
a biometric sensor positioned to at least partially overlap the display; and
an optical member comprising a light condenser positioned between the display and the biometric sensor,
wherein the biometric sensor includes a light receiving unit comprising light receiving circuitry configured to receive light emitted from the display and reflected by an external object,
wherein a length of the light receiving unit in a first direction, is the first direction being a polarization axis direction of the polarization layer, is greater than a length of the light receiving unit in a second direction crossing the first direction,
wherein the optical member includes a plurality of lenses, and
wherein a location of a principal plane of the optical member in the first direction is different from a location of principal plane of the optical member in the second direction.

2. The electronic device of claim 1, wherein a shape of the light receiving unit is rectangular.

3. The electronic device of claim 1, further comprising:
a battery,
wherein a long axis of the light receiving unit and a long axis of the battery are aligned in the first direction.

4. The electronic device of claim 1, wherein a distance between the principal plane of the optical member in the first direction and the light receiving unit is less than a distance between the principal plane of the optical member in the second direction and the light receiving unit.

5. The electronic device of claim 4, wherein a magnification of the optical member in the first direction is greater than a magnification in the second direction.

6. The electronic device of claim 5, wherein at least one of the plurality of lenses is an asymmetric lens having a curvature in the first direction different from a curvature in the second direction.

7. The electronic device of claim 6, wherein a cross-section of the asymmetric lens in the first direction is a cross-sectional shape of a concave lens, and a cross-section of the asymmetric lens in the second direction is a cross-sectional shape of a convex lens.

8. The electronic device of claim 5, further comprising:
a processor operatively connected to the display and the biometric sensor,
wherein the processor is configured to:
detect a touch of the external object;
cause one region of the display to emit light based on the touch of the external object;
obtain a raw image of an image magnification, the image magnification being different depending on a direction, based on light incident on the light receiving unit using the biometric sensor; and
obtain a fingerprint image by correcting the raw image such that all regions of the raw image have an identical image magnification.

9. The electronic device of claim 8, wherein the processor is configured to:
correct the raw image based on magnification information according to a circumferential angle of the raw image.

10. The electronic device of claim 9, wherein the processor is configured to:
compare the obtained fingerprint image with a pre-registered fingerprint image; and
based on determining that the obtained fingerprint image matches the pre-registered fingerprint image, perform a specified operation.

11. The electronic device of claim 5, further comprising:
a battery,
wherein a shape of one of the plurality of lenses is elliptical, and
wherein a long axis of the battery is aligned with a long axis of one of the plurality of lenses in the second direction.

* * * * *